United States Patent
Ewing et al.

(10) Patent No.: US 8,549,062 B2
(45) Date of Patent: *Oct. 1, 2013

(54) NETWORK REMOTE POWER MANAGEMENT OUTLET STRIP

(75) Inventors: Carrel W. Ewing, Reno, NV (US); Brian P. Auclair, Reno, NV (US); Andrew J. Cleveland, Reno, NV (US); James P. Maskaly, Sparks, NV (US); Dennis W. McGlumphy, Sun Valley, NV (US); Mark J. Bigler, Eugene, OR (US)

(73) Assignee: Server Technology, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/214,050

(22) Filed: Aug. 19, 2011

(65) Prior Publication Data

US 2012/0042180 A1 Feb. 16, 2012

Related U.S. Application Data

(63) Continuation of application No. 11/126,092, filed on May 9, 2005, which is a continuation of application No. 10/313,314, filed on Dec. 6, 2002, now Pat. No. 7,171,461, which is a continuation-in-part of application No. 09/930,780, filed on Aug. 15, 2001, now Pat. No. 7,043,543, which is a continuation-in-part of application No. 09/732,557, filed on Dec. 8, 2000, now Pat. No. 7,099,934, which is a continuation-in-part of application No. 09/375,471, filed on Aug. 16, 1999, now Pat. No. 6,711,613, which is a continuation-in-part of application No. 08/685,436, filed on Jul. 23, 1996, now Pat. No. 5,949,974.

(51) Int. Cl.
*G06F 15/173* (2006.01)
*G06F 1/26* (2006.01)

(52) U.S. Cl.
USPC ............... 709/201; 709/223; 307/11; 307/18; 307/31; 307/32; 307/36; 307/37; 307/43; 307/149; 439/652; 713/340; 361/601; 361/622

(58) Field of Classification Search
USPC ......... 709/201, 223; 361/601, 622; 713/340; 439/652; 307/11, 18, 31, 32, 36, 37, 43, 307/149

See application file for complete search history.

(56) References Cited

U.S. PATENT DOCUMENTS 4,729,375 A  3/1988  Jegers et al.
4,777,607 A  10/1988  Maury et al.

(Continued)

OTHER PUBLICATIONS

Interworking Labs Releases New, Extended SNMP Test Suite with Windows NT and Windows 95 Support, Interworking Labs, pp. 1-2, Jul. 15, 1996.

(Continued)

*Primary Examiner* — Haresh N Patel
(74) *Attorney, Agent, or Firm* — Perkins Coie LLP; William J. Pigott

(57) ABSTRACT

A vertical-mount network remote power management outlet strip embodiment of the present invention comprises a long, thin outlet strip body with several independently controllable power outlet sockets distributed along its length. A power input cord is provided at one end, and this supplies AC-operating power to relays associated with each of the power outlet sockets. The relays are each addressably controlled by a microprocessor connected to an internal I2C-bus serial communications channel. The power-on status of each relay output to the power outlet sockets is sensed and communicated back on the internal I2C-bus. A device-networking communications processor with an embedded operating system translates messages, status, and controls between the internal I2C-bus and an Ethernet port, and other external networks.

8 Claims, 8 Drawing Sheets

(56) References Cited

U.S. PATENT DOCUMENTS

| | | | |
|---|---|---|---|
| 4,814,941 A | 3/1989 | Speet et al. | |
| 5,424,903 A | 6/1995 | Schreiber | |
| 5,563,455 A | 10/1996 | Cheng | |
| 5,650,771 A | 7/1997 | Lee | |
| 5,949,974 A | 9/1999 | Ewing et al. | |
| 6,002,340 A | 12/1999 | Smith | |
| 6,086,397 A | 7/2000 | Chapman et al. | |
| 6,266,713 B1 | 7/2001 | Karanam et al. | |
| 6,476,729 B1 | 11/2002 | Liu | |
| 6,480,964 B1 | 11/2002 | Oh | |
| 6,557,170 B1 | 4/2003 | Wilder et al. | |
| 6,642,852 B2 | 11/2003 | Dresti et al. | |
| 6,711,163 B1* | 3/2004 | Reid et al. | 370/390 |
| 6,741,442 B1 | 5/2004 | McNally et al. | |
| 6,839,775 B1 | 1/2005 | Kao et al. | |
| 7,043,543 B2* | 5/2006 | Ewing et al. | 709/223 |
| 7,099,934 B1* | 8/2006 | Ewing et al. | 709/223 |
| 7,171,461 B2* | 1/2007 | Ewing et al. | 709/223 |
| 7,171,542 B1 | 1/2007 | Alfano et al. | |
| 7,702,771 B2* | 4/2010 | Ewing et al. | 709/223 |
| 2002/0043960 A1 | 4/2002 | Janik | |
| 2002/0052940 A1 | 5/2002 | Myers et al. | |
| 2004/0039821 A1 | 2/2004 | Giglio et al. | |
| 2004/0221181 A1 | 11/2004 | Yu | |
| 2005/0203987 A1 | 9/2005 | Ewing et al. | |
| 2006/0031453 A1 | 2/2006 | Ewing et al. | |
| 2006/0031454 A1 | 2/2006 | Ewing et al. | |
| 2006/0072531 A1 | 4/2006 | Ewing et al. | |
| 2006/0143289 A1 | 6/2006 | Smith et al. | |
| 2006/0259538 A1 | 11/2006 | Ewing et al. | |
| 2007/0016664 A1 | 1/2007 | Ewing et al. | |
| 2007/0050443 A1 | 3/2007 | Ewing et al. | |
| 2007/0130243 A1 | 6/2007 | Ewing et al. | |
| 2007/0136453 A1 | 6/2007 | Ewing et al. | |
| 2007/0140238 A1 | 6/2007 | Ewing et al. | |

OTHER PUBLICATIONS

2T-HA10F-CD 3.6 kVA Uninterruptible Power System: Operating information, Digital Equipment Corp., Order No. EK-HA10F-OP. B01, pp. 1-1 to 5-4, Aug. 1992.

A Software managing Clustered Multi-Vender Uninteruptible Power Supply on Network, IBM Tech. Disclosure Bulletin, vol. 42, No. 419, Mar. 1, 1999.

Touch-Pad Code-Actuated Electrical Outlet, IBM Tech. Disclosure Bulletin, vol. 33, No. 1A, 143-147, Jun. 1, 1990.

UPS MIB, Merling Gerin—DAM Division, www.exploits.org/nut/library/protocols/snmp/mgeups.mib, pp. 1-41, Oct. 11, 1995.

Liebert SiteNet SNMP MIBs, The Latest MIBs Available for Download, http://www.liebert.com/products/english/products/software/snmp/intro.asp?ID=921, pp. 1-2, Jul. 2, 2003.

Newman, J., Enterprise Power Protection: Don't Get UPSet; Get the Right UPS Instead, Network Computing, vol. 7, No. 2, pp. 1-10, Feb. 15, 1996.

"Expert Witness Report of Douglas Bors, PE" *Server Technology, Inc. v. American Power Conversion Corporation*, Case No. 3:06-CV-00698-LRH-VPC, 87 pp. (May 27, 2011).

"Expert Witness Report of Dr. Mark Horenstein Regarding Invalidity of STI's Patents" *Server Technology, Inc. v. American Power Conversion Corporation*, Case No. 3:06-CV-00698-LRH-VPC, 137 pp. (May 27, 2011).

"Expert Report of KC Mares" *Server Technology, Inc. v. American Power Conversion Corporation*, Case No. 3:06-CV-00698-LRH-VPC, 204 pp. (May 27, 2011).

"Rebuttal Expert Witness Report of Douglas Bors, PE" *Server Technology, Inc. v. American Power Conversion Corporation*, Case No. 3:06-CV-00698-LRH-VPC, 19 pp. (Jun. 29, 2011).

"Expert Report of B. Michael Aucoin, D. Engr., PE, PMP Consolidated Rebuttal of APC's Expert Invalidity Reports" *Server Technology, Inc. v. American Power Conversion Corporation*, Case No. 3:06-CV-00698-LRH-VPC, 152 pp. (Jun. 29, 2011).

"Expert Report of KC Mares (in Rebuttal to APC's Invalidity Reports)" *Server Technology, Inc. v. American Power Conversion Corporation*, Case No. 3:06-CV-00698-LRH-VPC, 33 pp. (Jun. 29, 2011).

"American Power Conversion Motion for Summary Judgment" *Server Technology, Inc. v. American Power Conversion Corporation*; Case No. 3:06-CV-00698-LRH-VPC; 4 pp.; Aug. 30, 2011.

"APC's Memorandum of Law in Support of Its Motion for Summary Judgment and Exhibits" *Server Technology, Inc. v. American Power Conversion Corporation*; Case No. 3:06-cv-00698-LRH-VPC; 75 pp.; Aug. 30, 2011.

"STI's Response to APC's Motion for Summary Judgment" *Server Technology, Inc. v. American Power Conversion Corporation*; Case No. 3:06-cv-00698-LRH-VPC; 85 pp.; Sep. 26, 2011.

"APC's Reply in Support of Summary Judgment and Exhibits" *Server Technology, Inc. v. American Power Conversion Corporation*; Case No. 3:06-cv-00698-LRH-VPC; 90 pp.; Oct. 14, 2011.

"Patent Owner's Revised Response to Non-Final Office Action, and Exhibits," Reexamination Control No. 95/001,485; 615 pp.; Jun. 20, 2011.

"Requestor's Revised Comments on Office Action of Jan. 15, 2011 and Patent Owner's Revised Response, and Exhibits," Reexamination Control No. 95/001,485; 380 pp.; Sep. 29, 2011.

Betty Yuan, "Remote Control Equals Power," Teleconnect, Feb. 2000, pp. 60-66, New York, NY USA.

Office Action dated Jun. 10, 2010; U.S. Appl. No. 11/125,963; USPTO.

Office Action dated Dec. 19, 2011; U.S. Appl. No. 11/243,823; USPTO.

Office Action dated Oct. 13, 2011; U.S. Appl. No. 11/459,011; USPTO.

Office Action dated Oct. 13, 2011; U.S. Appl. No. 11/548,187; USPTO.

Office Action dated Jun. 8, 2010; U.S. Appl. No. 11/738,417; USPTO.

Office Action dated Nov. 28, 2011; U.S. Appl. No. 12/853,193; USPTO.

Office Action dated Dec. 22, 2011; U.S. Appl. No. 11/126,092; USPTO.

Office Action dated Jun. 22, 2012; U.S. Appl. No. 12/853,193; USPTO; 11 pp.

Office Action dated Jul. 6, 2012; U.S. Appl. No. 11/243,823; USPTO; 31 pp.

Office Action dated Mar. 13, 2012; U.S. Appl. No. 13/091,082; USPTO; 47 pp.

Office Action dated Mar. 16, 2012; U.S. Appl. No. 12/963,538; USPTO; 50 pp.

Office Action dated Apr. 18, 2012; U.S. Appl. No. 11/126,092; USPTO; 28 pp.

Office Action dated Mar. 6, 2012; U.S. Appl. No. 12/965,563; USPTO; 20 pp.

American Power Conversion Corporation; Masterswitch VM Power Distribution Unit User Guide; 1999; 51 pp., Dec. 31.

American Power Conversion Corporation; MasterSwitch VM Power Distribution Unit Installation and Quick Start Manual; 2000; 20 pp., Dec. 31.

American Power Conversion Corporation; PowerNet SNMP Management Information Base (MIB) v3.1.0 Reference Guide; 1999; 48 pp., Dec. 31.

Bay Technical Associates, Inc.; download of www.BayTech.net from web.archive.org; 1997; 8 pp., Dec. 31.

Bay Technical Associates, Inc.; Owner's Manual for BayTech Remote Power Control Unit for Models RPC-2, RPC-2A, RPC-2 MD01, RPC3-15 Amp, RPC3-20 Amp, RPC-3A, RPC-4, RPC-5, RPC-7, RPC-21; Jan. 2000; 80 pp.

M2 Communications Ltd. M2 Presswire; BayTech's vertically mounted power strip helps network managers keep equipment up and running; Nov. 19, 1999; 1 p.

Systems Enhancement Corporation; Power Administrator 800: User's Manual; 1996; 50 pp., Dec. 31.

Office Action dated Jan. 31, 2011; U.S. Appl. No. 11/548,201; USPTO; 30 pp.

Office Action dated Mar. 29, 2012; Reexamination Control No. 95/001,485; USPTO; 103 pp.
Server Technology, Inc.; "Patent Owner's Response to Non-Final Office Action"; Reexamination Control No. 95/001,485; May 29, 2012; 56 pp.
Carrel W. Ewing; "Second Declaration of Carrel W. Ewing Under 37 CFR §1.132"; Reexamination Control No. 95/001,485; May 29, 2012; 140 pp.
Michael B. Aucoin; "Second Declaration of B. Michael Aucoin Under 37 CFR 1.132"; Reexamination Control No. 95/001,485; May 29, 2012; 58 pp.
Chris Hardin; "Second Declaration of Chris Hardin Under 37 CFR 1.132"; Reexamination Control No. 95/001,485; May 29, 2012; 9 pp.
KC Mares; "Second Declaration of KC Mares Under 37 CFR 1.132"; Reexamination Control No. 95/001,485; May 29, 2012; 5 pp.
Michael R. Henson; "Declaration of Michael R. Henson Under 37 CFR §1.132"; Reexamination Control No. 95/001,485; May 29, 2012; 30 pp.
American Power Conversion Corporation; "Notice of Second Office Action in Reexamination Proceedings," *Server Technology, Inc.* v. *American Power Conversion Corporation*; Case No. 3:06-CV-00698-LRH-VPC; Apr. 10, 2012; 87 pp.
Server Technology, Inc.; "STI's Response to APC's Notice of Second Office Action in Reexamination Proceedings," *Server Technology, Inc.* v. *American Power Conversion Corporation*; Case No. 3:06-CV-00698-LRH-VPC; Apr. 18, 2012; 5 pp.
Pinheiro et al.; "Load Balancing and Unbalancing for Power and Performance in Cluster-Based Systems"; May 2001; Department of Computer Science; Rutgers University; Technical Report DCS-TR-440; 11 pp.
Office Action dated Feb. 15, 2013; U.S. Appl. No. 13/290,944; USPTO; 16 pp.
Office Action dated Feb. 19, 2013; U.S. Appl. No. 12/853,193; USPTO; 23 pp.
Office Action dated Feb. 12, 2013; U.S. Appl. No. 13/195,836; USPTO; 22 pp.
Office Action dated Sep. 21, 2012; U.S. Appl. No. 12/965,563; USPTO; 26 pp.

* cited by examiner

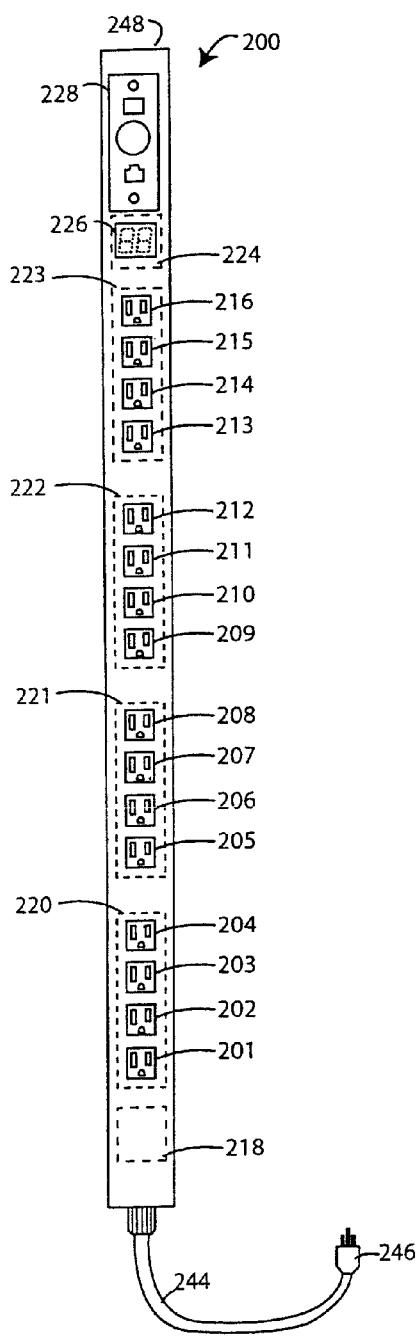
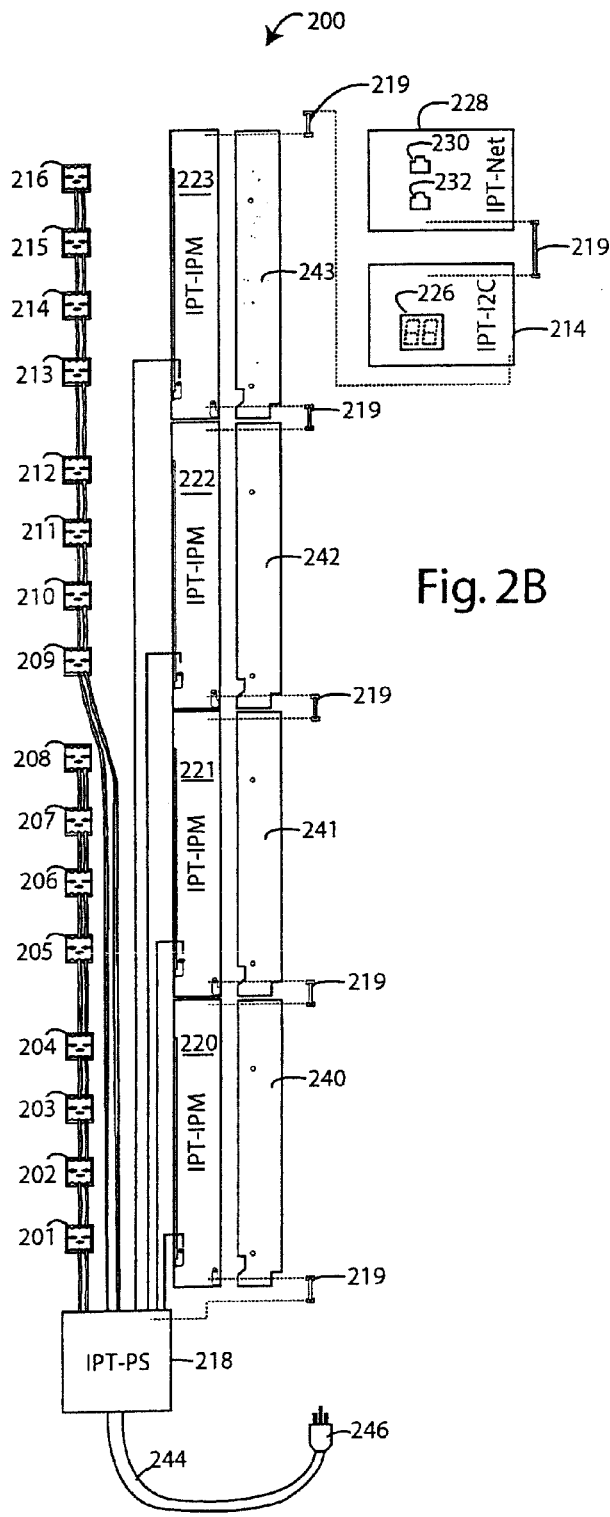

Fig. 3
Fig. 4
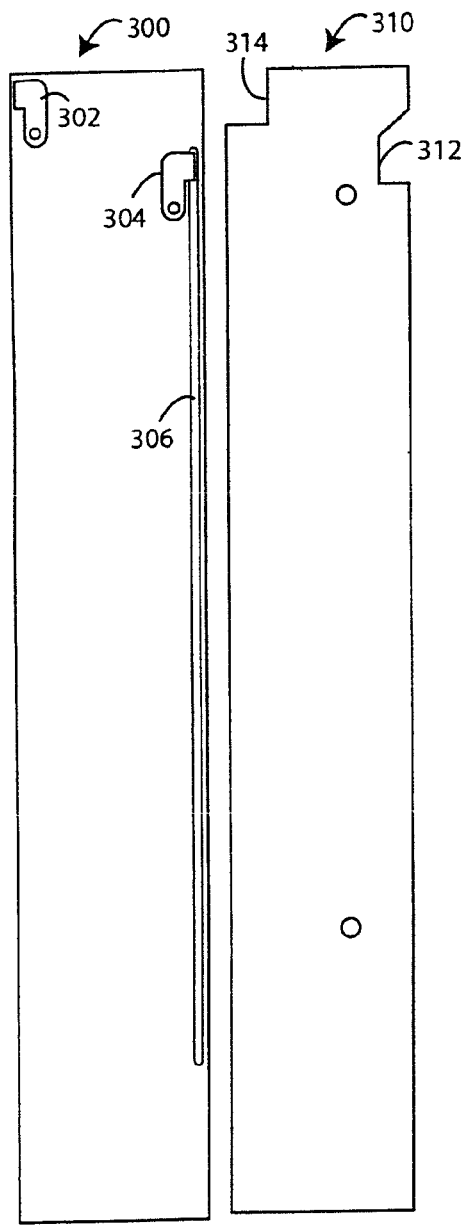
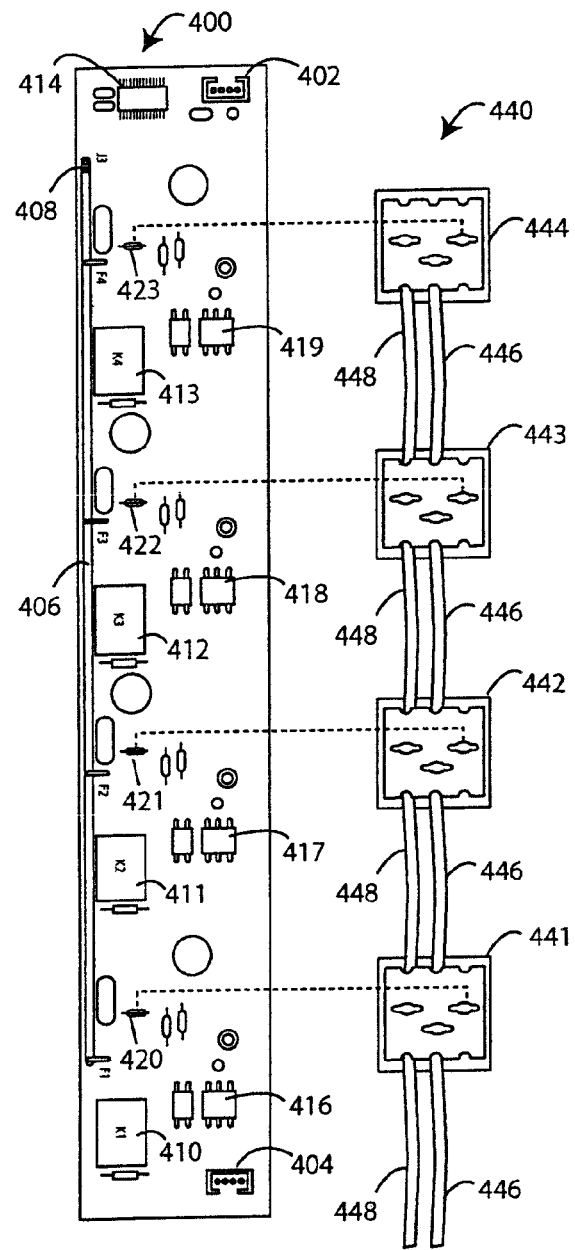

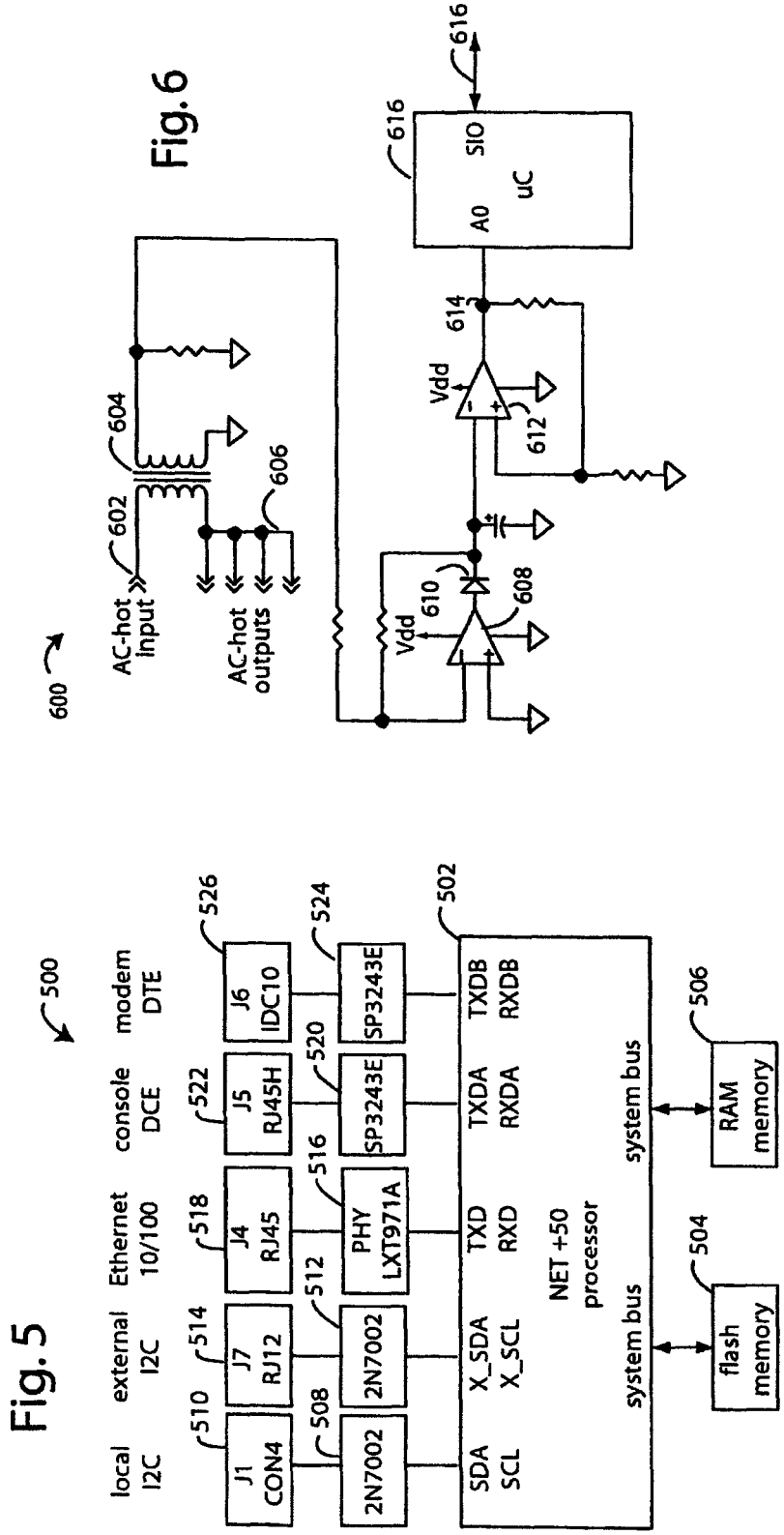

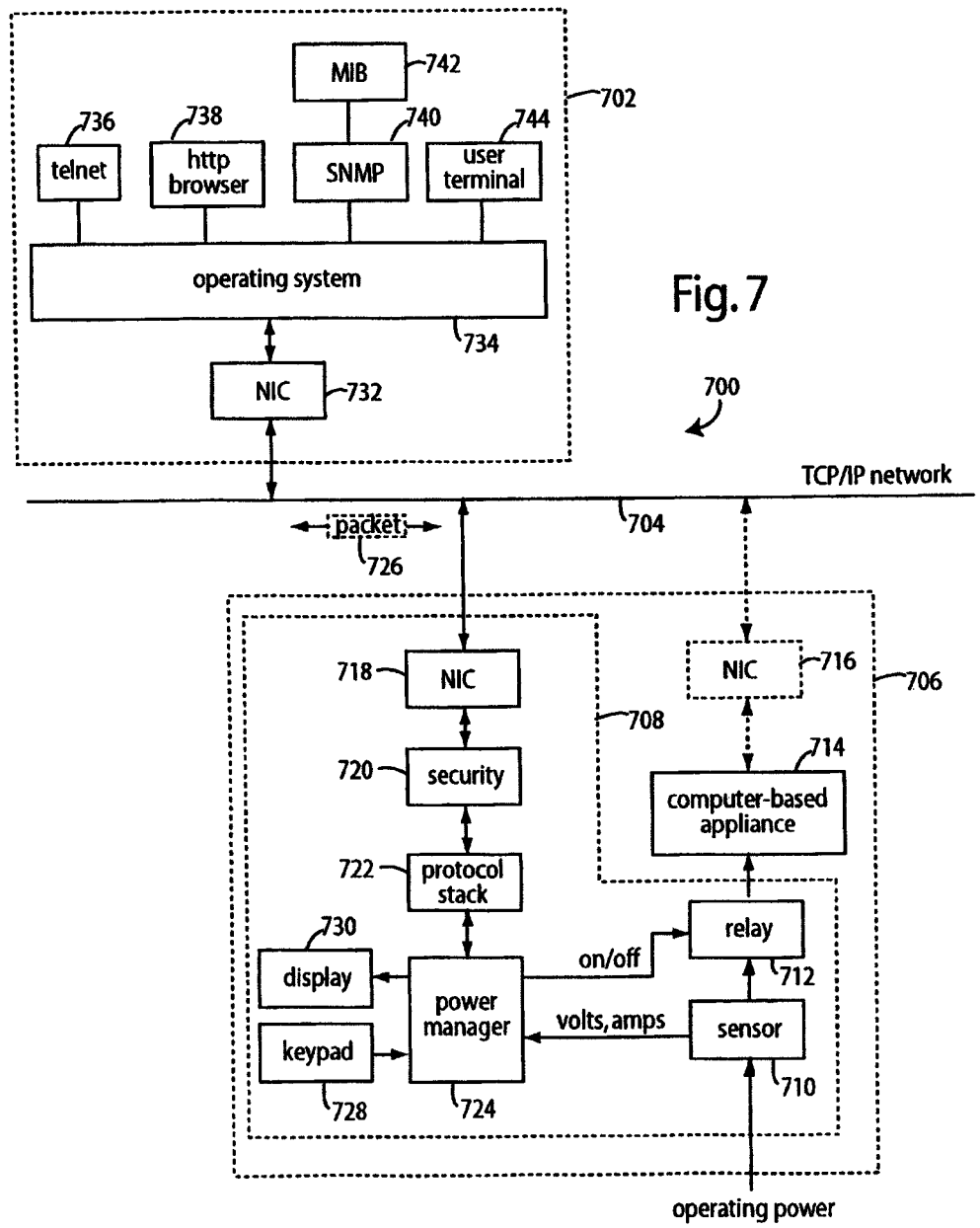

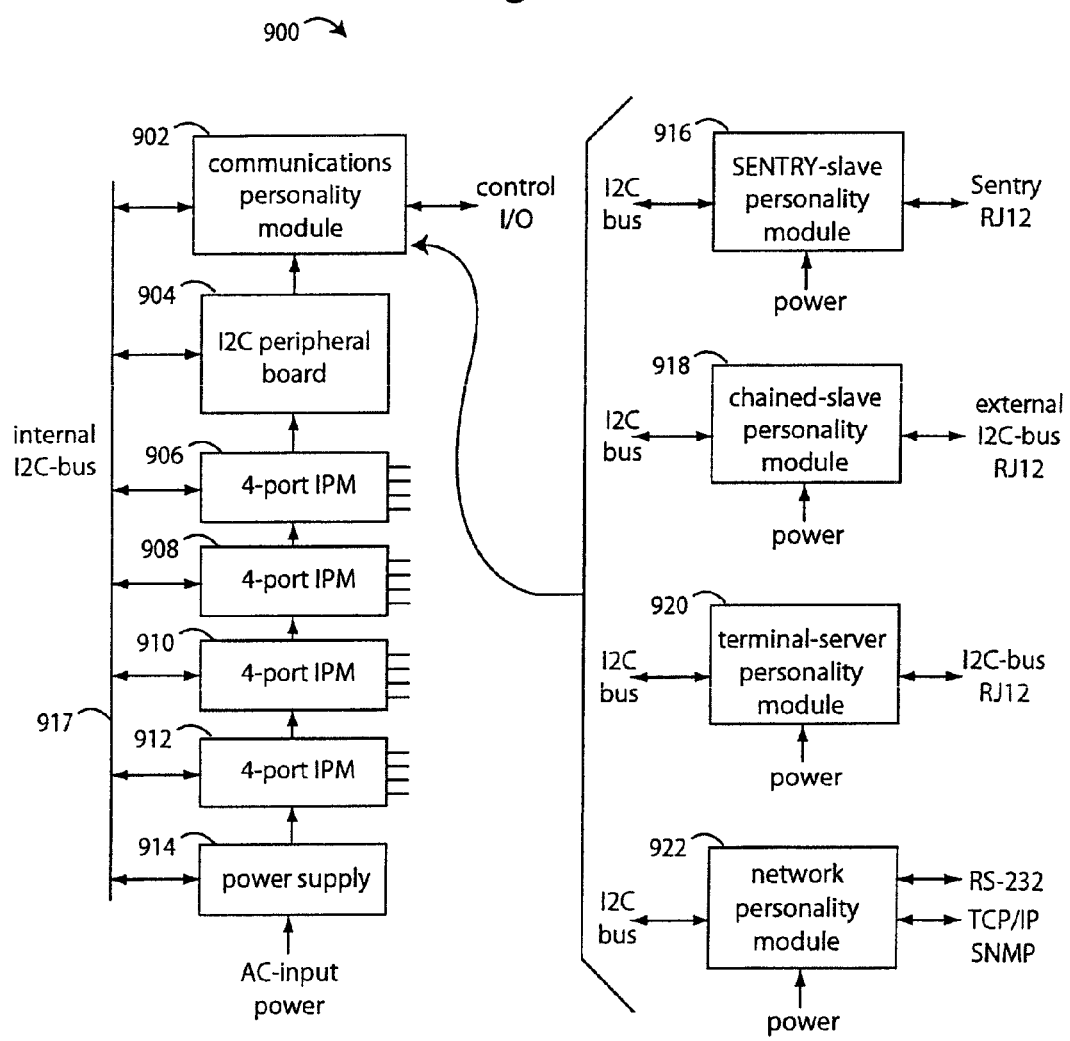

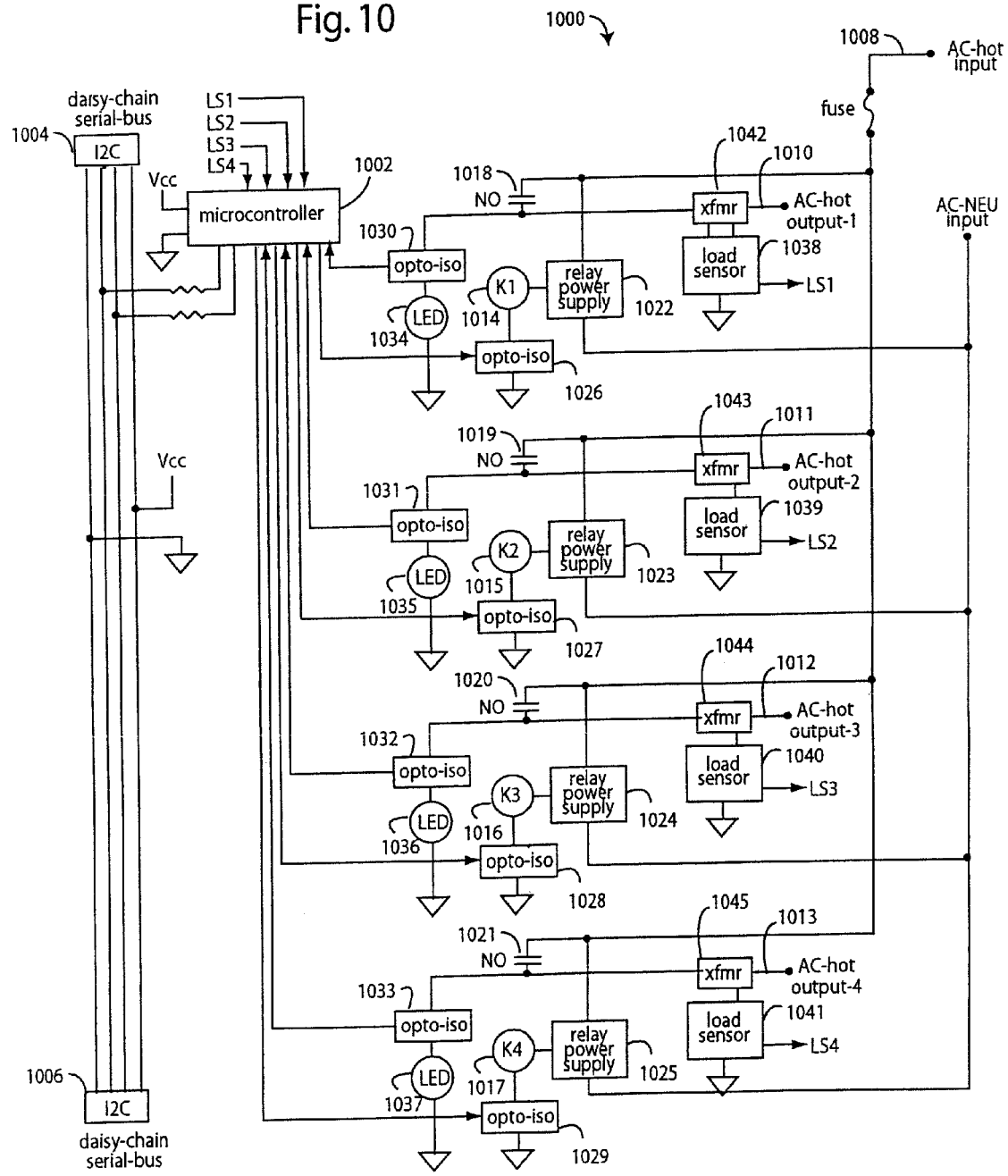

NETWORK REMOTE POWER MANAGEMENT OUTLET STRIP

RELATED APPLICATIONS AND PATENTS

This application is a continuation of U.S. patent application Ser. No. 11/126,092, filed May 9, 2005, and titled NETWORK POWER ADMINISTRATION SYSTEM, which is a continuation of U.S. patent application Ser. No. 10/313,314, filed Dec. 6, 2002, now U.S. Pat. No. 7,171,461, issued on Jan. 30, 2007, and titled NETWORK REMOTE POWER MANAGEMENT OUTLET, which is a continuation-in-part of U.S. patent application Ser. No. 09/930,780, filed Aug. 15, 2001, now U.S. Pat. No. 7,043,543, issued on May 9, 2006, and titled VERTICAL-MOUNT NETWORK REMOTE POWER MANAGEMENT OUTLET STRIP, which is a continuation-in-part of U.S. patent application Ser. No. 09/732,557, filed Dec. 8, 2000, now U.S. Pat. No. 7,099,934, issued on Aug. 29, 2006, titled NETWORK-CONNECTED POWER MANAGER FOR REBOOTING REMOTE COMPUTER-BASED APPLIANCES, which is a continuation-in-part of U.S. patent application Ser. No. 09/375,471, filed Aug. 16, 1999, now U.S. Pat. No. 6,711,613, issued on Mar. 23, 2004, titled REMOTE POWER CONTROL SYSTEM THAT VERIFIES WHICH DEVICES IS SHUT-DOWN BEFORE SUCH ACTION IS COMMITTED TO, which is a continuation-in-part of U.S. patent application Ser. No. 08/685,436, filed on Jul. 23, 1996, titled SYSTEM FOR READING THE STATUS AND CONTROLLING THE POWER SUPPLIES OF APPLIANCES CONNECTED TO COMPUTER NETWORKS, and now U.S. Pat. No. 5,949,974, issued on Aug. 7, 1999, which are hereby incorporated herein by reference.

BACKGROUND OF THE INVENTION

1. Field of the Invention

The invention relates generally to remote power management systems, and more particularly to electrical power distribution devices and methods for conserving the primary rack-mount spaces in a standard RETMA rack.

2. Description of the Prior Art

Network server "farms" and other network router equipment have settled on the use of equipment bays in 19" standard RETMA racks. Many of these server and router farms are located at telephone company (TelCo) central equipment offices because they need to tie into very high bandwidth telephone line trunks and backbones. So each TelCo typically rents space on their premises to the network providers, and such space is tight and very expensive.

The typical network router, server, or other appliance comes in a rack-mount chassis with a standard width and depth. Such chassis are vertically sized in whole multiples of vertical units (U). Each rented space in the TelCo premises has only so much vertical space, and so the best solution is to make best use of the vertical space by filling it with the network appliances and other mission-critical equipment.

Two kinds of operating power are supplied to such network appliances, alternating current (AC) from an uninterruptable power supply (UPS) or direct from a utility, the second kind is direct current (DC) from TelCo central office battery sets. Prior art devices have been marketed that control such AC or DC power to these network appliances. For example, Server Technology, Inc. (Reno, Nev.) provides operating-power control equipment that is specialized for use in such TelCo premises RETMA racks. Some of these power-control devices can cycle the operating power on and off to individual network appliances.

Such cycling of operating power will force a power-on reset of the network appliance, and is sometimes needed when an appliance hangs or bombs. Since the network appliance is usually located remote from the network administration center, Server Technology has been quite successful in marketing power managers that can remotely report and control network-appliance operating power over the Internet and other computer data networks.

Conventional power management equipment has either been mounted in the tops or bottoms of the server farm RETMA racks, and thus has consumed vertical mounting space needed by the network appliances themselves. So what is needed now is an alternate way of supplying AC or DC operating power to such network appliances without having to consume much or any RETMA rack space.

SUMMARY OF THE PRESENT INVENTION

Briefly, a vertical-mount network remote power management outlet strip embodiment of the present invention comprises a long, thin outlet strip body with several independently controllable power outlet sockets distributed along its length. A power input cord is provided at one end, and this supplies AC-operating power to relays associated with each of the power outlet sockets. The relays are each addressably controlled by a microprocessor connected to an internal I2C-bus serial communications channel. The power-on status of each relay output to the power outlet sockets is sensed and communicated back on the internal I2C-bus. A device-networking communications processor with an embedded operating system translates messages, status, and controls between external networks, the internal I2C-bus, and other ports.

In alternative embodiments of the present invention, a power manager architecture provides for building-block construction of vertical and horizontal arrangements of outlet sockets in equipment racks. The electronics used in all such variants is essentially the same in each instance. Each of a plurality of power input feeds has a monitor that can provide current measurements and reports on the internal I2C-bus. Each of the power input feeds could be independently loaded with a plurality of addressable-controllable outlets. Each outlet is also capable of measuring the respective outlet socket load current and repotting those values on the internal I2C-bus. Separate digital displays are provided for each monitored and measured load and infeed current. The internal I2C-bus, logic power supply, network interfaces, power control modules and relays, etc., could be distributed amongst several enclosures that have simple plug connections between each, the infeed power source, and the equipment loads in the rack.

An advantage of the present invention is that a network remote power management outlet strip is provided that frees up vertical rackmount space for other equipment.

Another advantage of the present invention is that a network remote power management outlet strip is provided for controlling the operating power supplied to network appliances over computer networks, such as TCP/IP and SNMP.

A further advantage of the present invention is that a network remote power management outlet strip is provided that allows a network console operator to control the electrical power status of a router or other network device.

A still further advantage of the present invention is that a network remote power management outlet strip is provided for reducing the need for enterprise network operators to dispatch third party maintenance vendors to remote equipment rooms and POP locations simply to power-cycle failed network appliances.

These and many other objects and advantages of the present invention will no doubt become obvious to those of ordinary skill in the art after having read the following detailed description of the preferred embodiments which are illustrated in the various drawing figures.

IN THE DRAWINGS

FIG. 2A is a front diagram of an implementation of the network remote power management outlet strip of FIG. 1;

FIG. 2B is an assembly diagram of the network remote power management outlet strip of FIG. 2A without the sheet-metal enclosure, and shows the interwiring amongst the AC-receptacles, the power input plug, and the various printed circuit board modules;

FIG. 3 is a non-component side diagram of a printed circuit board (PCB) implementation of an intelligent power module IPT-IPM, similar to those of FIGS. 1, 2A, and 2B, and further illustrates an insulating sheet that is fitted to the back;

FIG. 4 is a component-side diagram of a printed circuit board (PCB) implementation of an intelligent power module IPT-IPM, similar to those of FIGS. 1, 2A, 2B, and 3, and further illustrates the bus connections of the power outlet receptacles it sockets onto;

FIG. 5 is a functional block diagram of an IPT-NetworkPM module embodiment of the present invention;

FIG. 6 is a schematic diagram of a circuit that could be used in an implementation of the IPT-PS of FIGS. 1, 2A, and 2B;

FIG. 7 is a functional block diagram of a network remote power management system embodiment of the present invention;

FIG. 9 is a functional block diagram of a power distribution unit embodiment of the present invention; and FIG. 10 is a schematic diagram of one way to implement the IPT-IPM's in any of FIGS. 1-9.

DETAILED DESCRIPTION OF THE PREFERRED EMBODIMENTS

Figure 1:
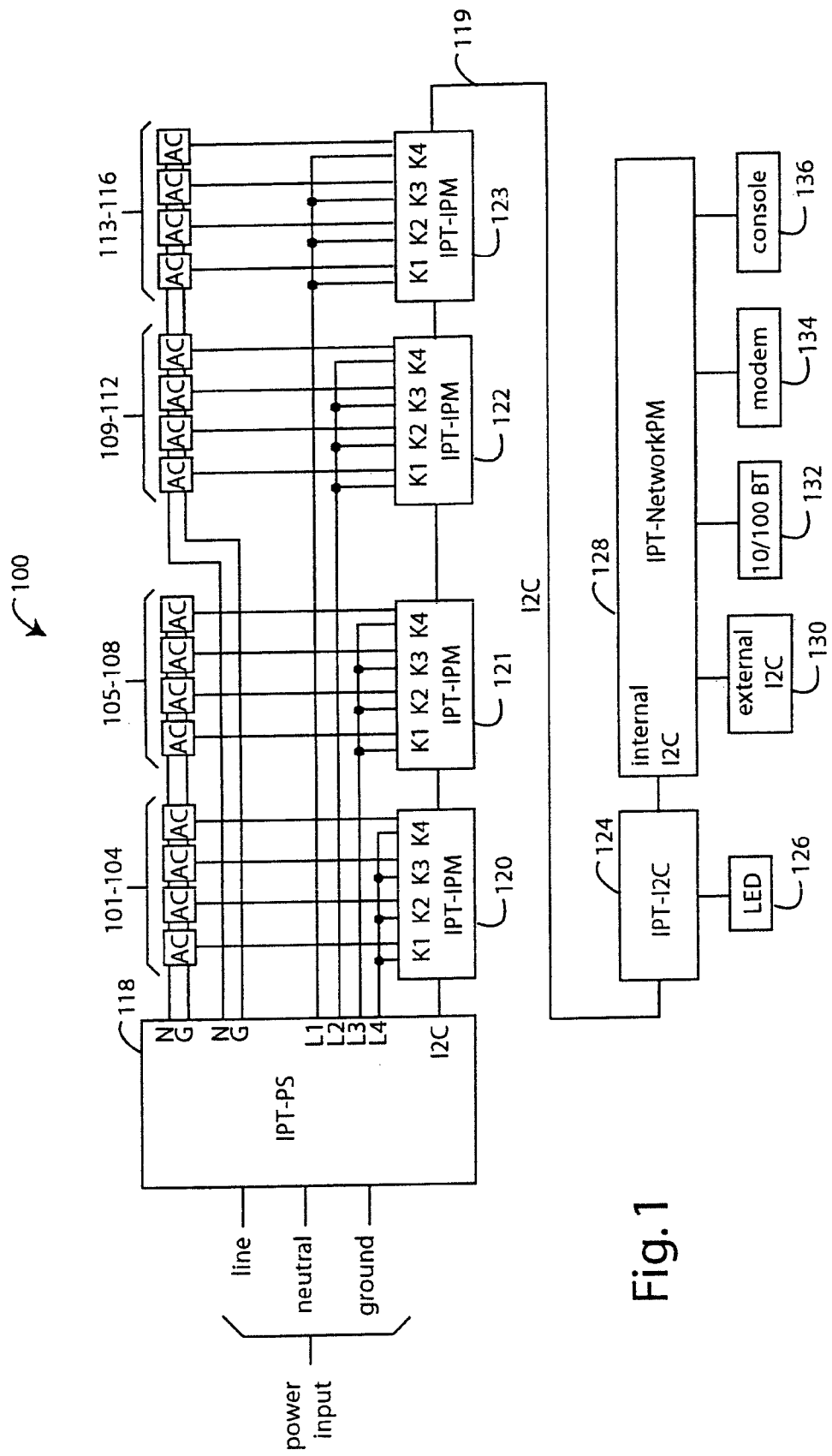
FIG. 1 is a functional block diagram of a network remote power management outlet strip embodiment of the present invention.

FIG. 1 represents a network remote power management outlet strip embodiment of the present invention, and is referred to herein by the general reference numeral 100. The outlet strip 100 provides independently managed power to each of sixteen AC-output receptacles 101-116. A power supply (IPT-PS) module 118 senses and totalizes the combined current delivered to all the AC-output receptacles 101-116 from its AC-power input.

Peripheral integrated circuits (IC's) that have to communicate with each other and the outside world can use a simple bi-directional 2-wire, serial data (SDA) and serial clock (SCL) bus for inter-IC (I2C) control developed by Philips Semiconductor. The I2C-bus has become a worldwide industry-standard proprietary control bus.

The IPT-PS module 118 digitally encodes the total AC-current information onto an internal I2C-bus 119. The IPT-PS module 118 supplies DC-operating power for the internal I2C-bus 119 which is derived from the AC-power input. Each of four intelligent power modules (IPT-IPM) 120-123 have four relays (K1-K4) that switch AC-power from the IPT-PS module 118 to respective ones of the sixteen AC-output receptacles 101-116. Such relays K1-K4 are controlled by a single I2C transceiver daisy-chain connected to others along the internal I2C-bus 119. Each such I2C transceiver is independently addressable on the I2C-bus 119, and provides a digitally encoded power-on status indication for all four relays K1-K4.

An I2C-module (IPT-I2C) 124 receives digital messages on the internal I2C-bus 119 and decodes and displays the totalized combined current, e.g., in AC-amperes, on an LED-readout 126. A user is thus able to see the effect on the total current caused by plugging or unplugging a load from any or all of the AC-output receptacles 101-116.

The Philips 87LPC762 microcontroller is used as an I2C interface to a dual seven-segment display. Port-0 pins select the illuminated segments of a seven-segment display. Pin P1.7 selects which of the two seven-segment displays is being driven, and alternates between the two seven-segment displays fast enough to avoid flicker. The I2C slave address is configurable. Five commands are supported: STAT (status) RBTN (Read button), RPRB (Read probe), CRST (Clear reset), and WDSP (Write display). A checksum is used on received/sent bytes for data integrity across the I2C-bus.

The IPT-I2C microcontroller starts up with the I2C interface in idle slave mode. Main ( ) waits in a loop until the I2C interface is flagged as non-idle. After an I2C start occurs, and the rising edge of SCL sets DRDY (and thus ATN), an I2C interrupt occurs. The I2C ISR disables the I2C interrupt and sets a global I2C non-idle flag. The main loop then proceeds to read in the first byte from the I2C-bus. When seven bits are received, the target I2C is known and is compared to the IPT-I2C microcontroller's own module address. If different, the I2C interface processing stops and waits for another start to begin again. If the same, the last bit of the first byte is read, which is the R/W bit. If a Read, then the IPT-I2C microcontroller acknowledges the byte and repeatedly sends a fixed number of response bytes: an address byte, a type byte, one or more data bytes, and a checksum. If a Write, then the IPT-I2C microcontroller acknowledges the byte, and then will read up to four more bytes: a command byte one or more data bytes, and a checksum. As received, the bytes are acknowledged and compared to expected valid commands and data. As soon as a valid command, any data parameters and a valid checksum are received and acknowledged, the command is acted upon. Without a valid checksum, the command is not acted upon. If an unexpected command or data is received, or more bytes are received than expected, then a negative acknowledge occurs after the next byte is received, and the I2C interface is stopped, and another start is needed to begin again. Throughout the I2C processing loop, a bus timeout (by Timer 1 interrupt) resets the I2C interface to idle and the I2C processing loop to the appropriate states Timer U also guards the I2C interface with a 5-millisecond inter-clock timeout and a 15 second total I2C timeout. The total I2C timeout is reset when the IPT-I2C microcontroller is addressed on the I2C with its primary address (not the secondary address).

The I2C IPT-I2C microcontroller commands include the STAT command which sets the IPT-I2C microcontroller to a read type to STAT. This means that an I2C Read will send four bytes (address, type data checksum) in which the data byte represents the status of the IPT-I2C microcontroller.

The RBTN command sets the IPT-I2C microcontroller read type to RBTN. This means that an I2C Read will send four bytes (address, type, data, checksum) in which the data byte represents the status of the button.

The RPRB command sets the IPT-I2C microcontroller read type to RPRB. This means that an I2C Read will send five bytes (address, type data, data, checksum) in which the data bytes represent the type of 1-wire bus probe and the probe data.

The CRST command clears the Reset Flag (RSTF), Power On Reset Flag (PORF), Brownout Reset Flag (BORF), and WatchDog Reset Flag (WDRF) bits of the IPT-I2C microcontroller status byte.

The WDSP command sets the values for the dual seven-segment display.

At power up, the dash-dash blinks until a valid WDSP command is received. After that, if ten seconds pass without receiving a valid WDSP command, the display reverts back to the blinking dash-dash.

A read command is started by the master addressing the slave with the R/W bit set. A read command to the slave IPT-I2C microcontroller results in a fixed number of bytes repeatedly being transmitted by the slave (address, type, data1 . . . dataN checksum). The first byte is the address of the slave. The second byte indicates the type of data in the following data byte(s). The last byte is a checksum of all the previous bytes.

A write command is started by the master addressing the slave with the R/W bit cleared. This is followed by the master transmitting multiple bytes to the slave, followed by a stop, or restart.

The internal I2C-bus 119 is terminated at a network personality module (IPT-NetworkPM) 128. Such provides an operating system, HTTP-server, and network interface between the internal I2C-bus 119, an external I2C-bus 130, an Ethernet 10/100 BaseT 132, a modem 134, and a local operator's console 136. The IPT-NetworkPM 128 preferably uses Internet protocols like TCP/IP and supports simple network management protocol (SNMP). In one application, the outlet strip 100 could be used in the remote power management environment described by the present inventors in their U.S. Pat. No. 5,949,974, issued Sep. 7, 1999. Such patent is incorporated herein by reference.

Network messages, e.g., using TCP/IP and SNMP, are communicated over the Ethernet 10/100 BaseT interface 132. Such messages are able (a) to independently control the power on-off to each of AC-output receptacles 101-116, (b) to read the power-on status of each, and (c) to report load current supplied by each outlet, or simply the total combined current measured passing through IPT-PS 118.

In one embodiment, the power applied to AC-output receptacles 101-116 is not allowed by the individual IPT-IPM modules 120-123 to be simultaneously applied. Instead, each is allowed to turn on in succession so any instantaneous load in-rush currents can not combine to exceed the peak capabilities of the AC-power input source.

The total input current display 126 could be used to advantage by a technician when installing or troubleshooting a RETMA equipment rack by watching how much current change is observed when each network appliance is plugged in and turned on. Unusually high or low currents can indicate particular kinds of faults to experienced technicians.
observed when each network appliance is plugged in and turned on. Unusually high or low currents can indicate particular kinds of faults to experienced technicians.

FIGS. 2A and 2B represent a network remote power management outlet strip embodiment of the present invention, which is referred to herein by the general reference numeral 200. These illustrate one way the network remote power management outlet strip 100 of FIG. 1 could be physically implemented and arranged. The outlet strip 200 provides independently managed power to each of sixteen AC-output receptacles 201-216. These have AC-neutral and AC-ground bussed through two sets of eight, e.g., with 12-gauge wire. A power supply (IPT-PS) module 218 is daisy-chained in an internal I2C-bus 219 to a series of four intelligent power modules (IPT-IPM) 220-223. The IPT-PS module 218 has, for example, a Philips microcontroller type 87LPC762 that senses and totalizes the combined current delivered on the AC-Line leads to all of four intelligent power modules (IPT-IPM) 220-223.

The Philips 87LPC762/7 microcontroller is programmed as an I2C 8-bit I/O Expander, with an 8-bit 4-channel A/D converter. Eight pins are individually selectable as either an Input (quasi-bidirectional) or Output (open drain). Four address lines determine the I2C slave address. Eight commands are supported: STAT (Status), RCFG (Read Config) RPRT (Read Port), RADC (Read ADC), CRST (Clear Reset), WCFG (Write Config), WPRT (Write Port), and ADCE (ADC Enable). A checksum is used on received/sent bytes for data integrity across the I2C-bus. Without a valid checksum, a command will not be acted upon.

The microcontroller starts up with the I2C interface in idle slave mode. Main( ) waits in a loop until the I2C interface is flagged as non-idle. After an I2C start occurs, and the rising edge of SCL sets DRDY and thus ATN, an I2C interrupt occurs. The I2C ISR disables the I2C interrupt and sets a global I2C non-idle flag. The main loop then proceeds to read in the first byte from the I2C-bus. When seven bits are received, the target I2C is known and is compared to the I/O Expander's own module address. If different, the I2C interface processing stops and waits for another start to begin again. If the same the last bit of the first byte is read, which is the R/W bit. If a Read, then the microcontroller acknowledges the byte, and repeatedly sends a fixed number of response bytes (an address byte, a type byte one or more data bytes, and a checksum). If a Write, then the microcontroller acknowledges the byte and then will read up to three more bytes (a command byte, a data byte, and a checksum). As received, the bytes are acknowledged and compared to expected valid commands and data. As soon as a valid command, any data parameters and a valid checksum are received and acknowledged, the command is acted upon. If an unexpected command or data is received, or more bytes are received than expected, then a negative acknowledge occurs after the next byte is received, and the I2C interface is stopped and another start is needed to begin again. Throughout the I2C processing loop, a bus timeout by Timer 1 interrupt resets the I2C interface to idle and the I2C processing loop to the appropriate state. Timer 0 also guards the I2C interface with a 5-millisecond inter-clock timeout and a 15-second total I2C timeout. The total I2C timeout is reset when the I/O Expander is addressed on the I2C with its primary address, not the secondary address.

The I2C microcontroller commands include the STAT command, which sets the I/O Expander read type to STAT. An I2C Read will send four bytes: address, type, data, checksum. The data byte represents the status of the I/O Expander.

The RCFG command sets the I/O Expander read type to RCFG. This means that an I2C Read will send four bytes: address, type, data, checksum. The data byte represents the I/O configuration of the eight I/O pins.

The RADC command sets the microcontroller read type to RADC. This means that an I2C Read will send eight bytes (address, type, ADCE status, ADC0 data, ADC1 data, ADC2 data, ADC3 data, checksum) in which the data bytes represent the value of the four ADC channels. For ADC channels that are disabled, a value of 0xFF is returned. For enabled ADC channels, the value represents the average of the last eight averages of 64 A/D conversions during the last four AC cycles. All four channels are converted once during each 1.042 ms, about 260 us apart. After four AC (60 Hz) cycles, each channel has be converted 64 times. For each channel these 64 conversions are averaged and stored. The most-recent eight stored averages are then again averaged, making the reported value the truncated average over 64×8=512 AC cycles, which spans just over a half second.

The CRST command clears, the ReSeT Flag (RSTF) Power On Reset Flag (PORF), BrownOut Reset Flag (BORF), and IiiatchDog Reset Flag (WDRF) bits of the I/O Expander status byte.

The WCFG command sets the microcontroller I/O configuration of the eight I/O pins. The WCFG command also sets the read type to RCFG.

The WPRT command sets the state of the eight I/O pins that are configured as outputs. The WPRT command also sets the read type to RPRT.

The ADCE command enables or disables any or all four ADC channels. The ADCE command also sets the read type to RADC.

A read command is started by the master addressing the slave with the R/W bit set. A read command to the slave IPT-I2C microcontroller results in a fixed number of bytes repeatedly being transmitted by the slave (address, type, data1 . . . dataN checksum). The first byte is the address of the slave. The second byte indicates the type of data in the data bytes that follow. The last byte is a checksum of all the previous data bytes.

A write command is started by the master addressing the slave with the R/W bit cleared. This is followed by the master transmitting multiple bytes to the slave, followed by a stop or restart.

The IPT-PS module 218 digitally encodes the total AC-input current information onto the internal I2C-bus 219. The IPT-PS module 218 derives DC-operating power from the AC-power input for modules on the internal I2C-bus 219. Each of the IPT-IPM modules 220-223 has four relays (K1-K4) that switch the AC-Line from the IPT-PS module 218 to respective ones of the AC-Line connections on each of the sixteen AC-output receptacles 201-216. Such relays K1-K4 are controlled by a single I2C transceiver located on each IPT-IPM 220-223. For example, such I2C transceiver could be implemented with a Philips microcontroller type 87LPC762.

Each such I2C transceiver is independently addressable on the I2C-bus 219, and provides a digitally encoded power-on status indication for all four relays K1-K4. An I2C-module (IPT-I2C) 224 receives digital messages on the internal I2C-bus 219 and decodes and displays the totalized combined current, e.g., in AC-amperes, on an LED-readout 226. The internal I2C-bus 219 terminates at a IPT-NetworkPM 228.

Preferably, IPT-NetworkPM 228 includes an operating system, an HTML webpage, and a network interface. Such can connect a remote user or command console with the internal I2C-bus 219, an external I2C-bus that interconnects with other outlet strips through a RJ-11 socket 230, an Ethernet 10/100 BaseT RJ-45 type socket 232, etc. The IPT-NetworkPM 228 preferably uses Internet protocols like TCP/IP and supports simple network management protocol (SNMP).

The modular construction of outlet strip 200 allows a family of personality modules to be substituted for IPT-NetworkPM 228. Each such would be able to communicate with and control the IPT-IPM's 220-223 via the internal I2C-bus 219.

The manufacturability and marketability of IPT-IPM 220-223 could be greatly enhanced by making the hardware and software implementation of each the same as the others. When a system that includes these is operating, it preferably sorts out for itself how many IPM's are connected in a group and how to organize their mutual handling of control and status data in and out.

FIG. 3 illustrates a printed circuit board (PCB) implementation of an intelligent power module IPT-IPM 300, similar to those of FIGS. 1, 2A, and 2B. On the component side of the PCB, the IPT-IPM 300 has a two-position connector 302 for AC-Neutral, and on the non-component side screw connector 304 for the AC-Line. A PCB trace 306 distributes AC-Line power input to a series of four power control relays, as shown in FIG. 4. An insulator sheet 310 screws down over the IPT-IPM 300 and protects it from short circuits with loose wires and the sheetmetal outlet strip housing.

For example, insulator sheet 310 can be made of MYLAR plastic film and may not necessarily have a set of notches 312 and 314 that provide for connector tabs 302 and 304. Connector tabs 302 and 304 can alternatively be replaced with a two-position connector with screw fasteners.

FIG. 4 illustrates the component side of a PCB implementation of an IPT-IPM module 400, e.g., the opposite side view of the IPT-IPM module 300 in FIG. 3. The IPT-IPM module 400 comprises a pair of I2C daisy chain bus connectors 402 and 404, a PCB trace 406 distributes AC-Line power input from AC-Line screw connector 304 connect at a via 408 to a series of four power control relays 410-413. A microcontroller 414 processes the I2C communications on the internal I2C-bus, e.g., I2C-bus 119 in FIGS. 1 and 219 in FIGS. 2A and 2B.

FIG. 5 shows the basic construction of an IPT-NetworkPM module 500, and is similar to the IPT-NetworkPM module 128 of FIGS. 1 and 228 of FIGS. 2A and 2B. A NetSilicon (Waltham, Mass.) type NET+50 32-bit Ethernet system-on-chip for device networking is preferably used to implement a communications processor 502. A flash memory 504 provides program storage and a RAM memory 506 provides buffer and scratchpad storage for the communications processor operations. A local I2C-bus is implemented in part with a pair of 2N7002 transistors, for example. It connects into the I2C daisy chain with a J1-connector (CON4) 510. An external I2C-bus is implemented in part with a pair of 2N7002 transistors, for example. It connects into an external I2C system with an RJ12-type J7-connector 510. Such external I2C system can expand to one additional outlet strip that shares a single IPT-NetworkPM module 500 and a single network connection.

An Ethernet 10/100 BaseT interface with the media access controller (MAC) internal to the communications processor 502 is provided by a physical layer (PHY) device 516. An Intel type LXT971A fast Ethernet PHY transceiver, for example, could be used together with an RJ45 connector 518. A pair of RS-232 serial interfaces are implemented in part with an SP3243E transceiver 520, an RJ45H connector 522, another SP3243E transceiver 524, and an IDC10 connector 526.

The flash memory 504 is preferably programmed with an operating system and HTML-browser function that allow web-page type access and control over the Ethernet channel. A complete OS kernel, NET+Management simple network management protocol (SNMP) MIBII and proxy agent, NET+Protocols including TCP/IP, NET+Web HTTP server, and XML microparser, are commercially available from NetSilicon for the NET+50 32-bit Ethernet system-on-chip.

FIG. 6 represents a circuit 600 that could be used in an implementation of the IPT-PS 118 of FIG. 1 and IPT-PS 218 of FIGS. 2A and 2B. An AC-Line input 602 from the AC-power source is passed through the primary winding of an isolation transformer 604. A set of four AC-Line outputs 606 are then connected to the four IPT-IPM's, e.g., 120-123 in FIGS. 1 and 220-223 in FIGS. 2A and 2B. The voltage drop across the primary winding of isolation transformer 604 is relatively small and insignificant, even at full load. So the line voltage seen at the AC-Line outputs 606 is essentially the full input line voltage.

A voltage is induced into a lightly loaded secondary winding that is proportional to the total current being drawn by all the AC-loads, e.g., AC-receptacles 101-116 in FIGS. 1 and 201-216 in FIGS. 2A and 2B. An op-amp 608 is configured as a precision rectifier with an output diode 610 and provides a DC-voltage proportional to the total current being drawn by all the AC-loads and passing through the primary of transformer 604. An op-amp 612 amplifies this DC-voltage for the correct scale range for an analog-to-digital converter input (A0) of a microcontroller (uC) 616. A Philips Semiconductor type P87LPC767 microcontroller could be used for uC 616. Such includes a built-in four-channel 8-bit multiplexed A/D converter and an I2C communication port. When a READ ADC command is received on the I2C communication port, the A0 input is read in and digitally converted into an 8-bit report value which is sent, for example, to LED display 126 in FIG. 1.

A prototype of the devices described in connection with FIGS. 1-6 was constructed. The prototype was a combination of new hardware and software providing for a 4-outlet, 8-outlet, or 16-outlet vertical-strip power manager that could be accessed out-of-band on a single RJ45 serial port, or in-band over a 10/100Base-T Ethernet connection by Telnet or an HTML browser. An RJ12 port was connected to a second, nearly identical vertical-strip power manager that was almost entirely a slave to the first, e.g., it could only be controlled by/via the first/master vertical power manager.

Vertical power manager hardware and software was used for the IPT-PS power supply board, the IPT-IPM quad-outlet boards, and IPT-I2C peripheral/display board. For the master vertical power manager, new personality module hardware and software was developed. This personality module, trademarked SENTRY3, was based upon the NetSilicon NetARM+20M microprocessor, and provided all of the control and user interface (UI). On the slave vertical power manager, a preexisting IPT-Slave personality module was modified slightly to bridge the external and internal I2C-buses. This allowed the master to control the slave vertical power manager exactly the same as the master vertical power manager, with no software or microprocessor needed on the slave. New software could be included to run in a microprocessor on the slave vertical power manager personality module to act as a backup master for load-display and power-up sequencing only.

A new SENTRY3 personality module was developed to support an HTML interface for Ethernet, and a command-line interface for Telnet and serial. Multiple users were supported, up to 128. One administrative user (ADMN) existed by default, and will default to having access to all ports. Outlet grouping was supported, with up to 64 groups of outlets.

There were two I2C-buses that can support up to sixteen quad-IPM (IPT-IPM) boards, across four power inputs, with at most four quad-IPM's per input, and with each input having its own load measurement and display. Each power input was required to have the same number of quad-IPM's that it powered. There was one I2C peripheral/display (IPT-I2C) board for each power input. Each bus had only one smart power supply (IPT-PS) board at I2C address 0x5E. Each bus had at least one I2C peripheral/display (IPT-I2C) board at I2C address 0x50, and at least one quad-IPM (IPT-IPM) board at I2C address 0x60 (or 0x40).

Determining what was present on an I2C-bus, and at what address, was done by reading the 8-bit. I/O port of the power supply. The eight bits were configured as,

| | |
|---|---|
| Bit 0 => | Undefined |
| Bit 1 => | Display orientation (1 = Upside-Up, 0 = Upside-Down) |
| Bit 2 => | Number of quad-IPM's per power input |
| Bit 3 => | Number of quad-IPM's per power input |
| Bit four => | Overload point (1 = 30.5A [244ADC], 0 = 16.5A [132ADC]) |
| Bit 5 => | Undefined |
| Bit 6 => | Number of power inputs |
| Bit 7 => | Number of power inputs |

Bits 2 & 3 together determine how many quad-IPM's there were per power input. Bits 6 & 7 together determine how many power input feeds there were.

The I2C address of the quad-IPM's were determined by the version of LPC code on the IPT-PS board, as determined by a read of the STATus byte of the of the IPT-PS.

| | |
|---|---|
| Version 3+ => | quad-IPM's start @ 0x60 and were 0x60, 0x62, 0x64, 0x66, 0x68, 0x6A, 0x6C, 0x6E, 0x70, 0x72, 0x74, 0x76, 0x78, 0x7A, 0x7C, 0x7E. |
| Version 2- => | quad-IPM's start @ 0x40 and were 0x40, 0x42, 0x44, 0x46, 0x48, 0x4A, 0x4C, 0x4E, 0x50, 0x52, 0x54, 0x56, 0x58, 0x5A, 0x5C, 0x5E. |

Up to four IPT-I2C peripheral/display boards were supported at I2C addresses: 0x50, 0x52, 0x54, and 0x56.

There was a direct mapping relationship between power inputs, IPT-I2C peripheral/display boards I2C addresses, and the IPT-IPM boards I2C addresses:

| Power Input | IPT-I2C address | IPT-IPM v3+ addresses (subtract 0x20 for v2-) |
|---|---|---|
| A | 0x50 | 0x60, 0x62, 0x64, 0x66 |
| B | 0x52 | 0x68, 0x6A, 0x6C, 0x6E |
| C | 0x54 | 0x70, 0x72, 0x74, 0x76 |
| D | 0x56 | 0x78, 0x7A, 0x7C, 0x7E |

Considering that each input power feed can support up to four quad-IPM's (sixteen ports), and that each bus can have four input feeds, and that there were two I2C-buses, an addressing scheme for a port must include three fields (a) Bus ID, (b) Input Feed ID, and (c) Relay ID The Bus ID could be regarded as vertical-strip power manager/enclosure ID, since one I2C-bus were for the internal/local I2C vertical power manager components and the other I2C-bus were for the external/remote vertical power manager. Other implementations could use a CAN bus in place of the external I2C-bus. Each enclosure had an address on the bus, e.g., an Enclosure ID. Thus, the three address fields needed were (a) Enclosure ID, (b) Input Feed ID, and (c) Relay ID.

The Enclosure ID was represented by a letter, starting with "A", with a currently undefined maximum ultimately limited to "Z". Only "A" and "B" existed for the prototype. The Input Feed ID was represented by a letter, with a range of "A" to "D". The Relay ID was represented by a decimal number, with a range of "1" to "16".

An absolute identifier was needed for the user to enter commands. A combination of Enclosure ID, Input Feed ID, and Relay ID must be expressed in the absolute ID. This were done with a period followed by two alphabet characters and then one or two numeric characters, e.g.,
".{enclosure_id} [input_feed_id] {#} [#]".

The first alphabet character represented the Enclosure ID ("A" to "Z"). The second alphabet character represented the Input Feed ID ("A" to "D"). The third and fourth number characters represented the Relay ID ("1" to "16"), e.g., ".{A ※ Z} [A ※ D] {1 ※ 16}". The input feed ID was optional. If not specified, "A" was assumed. With an absolute ID scheme, a period, letter, and number must always be entered, making it very similar to our current scheme, but allowing for future multiple input feeds. For displaying IDs, the optional input feed ID should only be shown when the port was in an enclosure with 2 or more input feeds. A vertical power manager ID could be specified with just a period and letter. An input feed ID could be specified with a period and two letters.

Existing outlets were determined by reading the power supply I/O port of the master and slave vertical power manager. One administrative user exists by default, and has access to all outlets and groups. This administrator (ADMN) could be removed, but only if one or more other users with administrative privileges exist. Additional users could be created or removed. Administrative privileges could be given to or removed from added users.

The administrative privilege allows access to all currently-detected outlets and groups without those outlets or groups actually being in the user's outlet or group tables. Lists of outlets or groups for administrative users should include all currently-detected outlets and groups. This allowed administrative privileges to be given or taken away without affecting the users outlet and group tables.

Groups of outlets could be created or removed. Outlets could be added or removed from groups. Outlets, or groups of outlets, could be added or removed from users. An outlet may belong to multiple groups. All user-defined outlet and groups names were unique. This were enforced at the time names were defined by the user. All user-defined names also cannot be the same as any KEYWORDS. For example, they cannot be "GROUP", "OUTLET", or "ALL". This were enforced at the time names were defined by the user. Usernames were uppercased when stored and displayed, and were compared case-insensitive. Passwords were stored and compared case-sensitive. Separate tables existed for each user's outlet access and group access.

When an ADMN user specifies "ALL" it means all currently detected outlets. For non-ADMN users, the "ALL" parameter refers to all of the outlets in the current user's outlet access table. There was no "all" to refer to all groups.

All commands that specify outlet IDs need to be bounds-checked against the currently detected number of enclosures, number of input feeds on the target enclosure, and the number of relays on the target enclosure. Power actions could be applied to only one target at a time. The target could be an outlet or a group of outlet.

A wakeup state determined the default power-up state of each outlet. Power-on sequencing occurred independently on each vertical power manager and power feed, with each outlet being initialized to its wakeup state two seconds after the previous outlet, e.g., starting with outlet-1. Outlet names could be up to 24-characters. These were stored and displayed case-sensitive, but were compared case-insensitive as command parameters. Group names could be up to 24-characters. These were stored and displayed case-sensitive, but were compared case-insensitive as command parameters. A 24-character vertical power manager/enclosure name could be user-defined. This were stored and displayed case-sensitive, but was compared case-insensitive as a command parameter. A 32-character location name could be user-defined. This were stored and displayed case-sensitive. Usernames could be 1-16 characters, and were case-insensitive. Passwords also could be 1-16 characters, and were case-sensitive. Variable length command parameters were length-checked for validity. An error was displayed if too short or too long, as opposed to and automatic behavior, such as truncating a string that was too long.

| Prototype I2C Address Map | | |
|---|---|---|
| Device | I2C Address (binary) | I2C Address (hex) |
| I2C-01 | 0101-000x | 0x50 |
| I2C-02 | 0101-001x | 0x52 |
| I2C-03 | 0101-010x | 0x54 |
| I2C-04 | 0101-011x | 0x56 |
| IPT-PS | 0101-111x | 0x5E |
| IPM-01 | 0110-000x | 0x60 |
| IPM-02 | 0110-001x | 0x62 |
| IPM-03 | 0110-010x | 0x64 |
| IPM-04 | 0110-011x | 0x66 |
| IPM-05 | 0110-100x | 0x68 |
| IPM-06 | 0110-101x | 0x6A |
| IPM-07 | 0110-110x | 0x6C |
| IPM-08 | 0110-111x | 0x6E |
| IPM-09 | 0111-000x | 0x70 |
| IPM-10 | 0111-001x | 0x72 |
| IPM-11 | 0111-010x | 0x74 |
| IPM-12 | 0111-011x | 0x76 |
| IPM-13 | 0111-100x | 0x78 |
| IPM-14 | 0111-101x | 0x7A |
| IPM-15 | 0111-110x | 0x7C |
| IPM-16 | 0111-111x | 0x7E |

The prototype required several major software components to be constructed for use with the NetSilicon NET+50 device. The configuration and operational control blocks used in the prototype were described in the following tables. All of the control blocks were readable by all components in the system. The configuration control blocks were written by the user interface tasks. When the configuration control blocks were modified, the modifications were mirrored in EEPROM where copies of these control blocks were stored. The operational control blocks were also accessible to all components for read access, but each operational control block has an "owner" that performs all writes to the operational control blocks. If a non "owner" wishes to change an operational control block, a signal or message was used to let the "owner" know the control block should be updated.

The major design tasks for the prototype included designing and documenting the external I2C protocol that was used to communicate to "chained" SENTRY boxes, and the new command line interface commands to support features that were previously available only via the SENTRY SHOW Screen interface. The HTML code was developed for the prototype, as well as the "slave" SENTRY code to run in a personality module of a "chained" SENTRY. Further discrete design efforts were required to code the system initialization, the local I2C task, the external I2C task, the serial port control task, the telnet control task, the user interface task, the power coordination task, the extern user interface (button/LED) control task, and the WEB control task.

The major software components developed for the prototype are listed in the following Tables.

SenINIT—SENTRY initialization procedure. This software was the first SENTRY software that executes. It performs hardware, software (builds the Configuration and Operational global control blocks), and OS initialization. This code spawns the SENTRY operational tasks that provide the system services.

TskSER—One instance of this task was spawned for each active serial port. In the initial product there was one instance of this task. This task spawns TskUSR when a logon was detected. This task owns the serial port operational array control block in global memory. This control block was updated to reflect the status of the serial port. Once a TskUSR was spawned, this task performs serial port monitoring functions and if modem status signal indicate a lost connection, this task will signal TskUSR (via an OS interface) of this event.

TskTELNET—One instance of this task was spawned to listen for telnet connections. When a connection was detected, this task spawns TskUSR for the connection.

TskFTP—One instance of this task was spawned to listen for FTP connections. The function of this task was to provide field software updates for the system. The mechanism used was determined based on the developer kit capabilities.

TskWEB—This task was to provide WEB access via the system provided WEB server. The mechanism and number of instances of this task was determined based on the developer kit capabilities.

TskI2C—There were two versions of this task; the local version that controls internal I2C connections and the global version that controls external I2C connections. For the first implementation there were two instances of this task, one to control the single I2C internal connection and one to control the single I2C external connection. These tasks implement the protocol for communicating control requests from the system to the I2C connected devices. Control requests were received via system signals or messages (depending on the OS capabilities) from the power control coordinating task (TskPCntl) for power control requests and from the external user interface task (TskEUI) for LED control requests. This task communicates power control status updates received from the IPM's to TskPCntl and external button status updates to TskEUI using system signals or messages as necessary.

TskPCntl—This was the power control coordinating task. There was one instance of this task. This task receives power control request from the user interface tasks (TskUSR and TskWEB) via system provided signals or messages and passes them to the correct I2C task (internal or external) using signals or messages. This task receives status updates from the I2C tasks via signals or messages. TskPCntl "owns" the IPMO and PCRO arrays and it updates the status fields in entries in these arrays as necessary.

TskEUI—This was the external user interface task that handles the push button functions and the LED display functions for the system. This task communicates with the local TskI2C via signals or messages to update the LED. TskI2C sends signals or messages to this task when the state of the external push button changes.

TskUSR --- This command line user interface task was spawned by TskSER and TskTELNET when a user connection was detected. This task verifies the user login and then implements the command line interface. This routine communicates power control commands via signals or messages to TskPCntl. This routine "owns" the active command line user array. Because there were multiple instances of this task, locks were used to serialize access to the active user array.

TskSYS --- This was the general system task. Specific functions for this task were defined as development progressed.

The control blocks were globally addressable by all software in the system. Such data structures exist in RAM and were mirrored in EEPROM memory. They were constructed during system initialization using the non volatile versions in EEPROM memory. If the EEPROM memory was empty, the control blocks were built using defaults and the EEPROM memory was initialized using defaults as well. All software has read access to all of the data structures. The data in these control blocks was configuration data and was only changed as a result of configuration updates. The data was mostly static and was written during initialization and when configuration changes occur during an authorized user session. All write access to this data consists of a two step process where the Global RAM copy of the data was updated followed by an update of the EEPROM copy of the data. There were seven global configuration control blocks as illustrated below. The following Tables describe each control block structure used in the prototype.

SENTRY Configuration Table (SCT) - - This control block contains global configuration information. There was a single instance of this control block.

Username/Password Array (UNP) - - This was an array of control blocks with each entry representing a user defined to the system. System locks were used to serialize access to this array when adding/deleting users. There was room for sixty-four entries in this array.

Intelligent Power Module (IPM) Array - - This was an array of control blocks with each entry representing an IPM defined to the system. There was room for 32 entries in this array.

Power Control Relay (PCR) Array - - This was an array of control blocks with each entry representing an PCR defined to the system. There was room for 128 entries in this array.

Group Power Control Relay (GRP) Array - - This was an array of control blocks with each entry representing an Group of PCRs. There was room for 64 entries in this array.

Serial Port (SER) Array -- This was an array of control blocks with each entry representing a serial port that can be used to access the system. There was room for two entries in this array.

I2C Array - - This was an array of control blocks with each entry representing an I2C connection. There was room for two entries in this array.

The Global RAM Operational Control Block Structures were globally addressable by all software in the system. These data structures exist only in RAM and are lost during a system restart. They were constructed during system initialization using current operational values. All software has read access to all of the data structures. The data in these control blocks was operational data and was changed to reflect the current operational status of devices in the system. Each of these control blocks has an "owner" task that performs updates by writing to the control block. There were six global operational control blocks as illustrated below. Complete descriptions of each control block structure follows.

Intelligent Power Module (IPMO) Array - - This was an array of control blocks with each entry representing an IPM defined to the system. There was room for 32 entries in this array. The entries in this array correspond directly to the IPM configuration control block. These control blocks contain dynamic information that changes regularly. The relay coordination task (TskPCntl) "owns" this array.

Power Control Relay (PCRO) Array - - This was an array of control blocks with each entry representing an PCR defined to the system. There was room for 128 entries in this array. The entries in this array correspond directly to the PCR configuration control block. These control blocks contain dynamic information that changes regularly. The relay coordination task (TskPCntl) "owns" this array.

I2C (I2CO) Array - - This was an array of control blocks with each entry representing an I2C connection. There was room for 2 entries in this array. The entries in this array correspond directly to the I2C configuration control block. These control blocks contain dynamic information that changes regularly. The I2C task (TskI2C) "owns" this array.

Serial Port (SERO) Array - - This was an array of control blocks with each entry representing a serial port that can be used by the system. There was room for two entries in this array. The entries in this array correspond directly to the serial port configuration control block. These control blocks contain dynamic information that changes regularly. The serial port task (TskSER) "owns" this array.

Active Command Line User (UCLI) Array - - This was an array of control blocks with each entry representing a current active command line user of the system. The SCT was room for 5 entries in this array. These control blocks contain dynamic information that changes regularly. The user interface task (TskUSR) "owns" this array. There were multiple instances of TskUSR so locks were used for this array.

Active HTTP Interface User (UHTP) Array - - This was an array of control blocks with each entry representing a WEB user. There was room for 5 entries in this array. These control blocks contain dynamic information that changes regularly. The WEB task (TskWEB) "owns" this array.

In FIG. 7, a network remote power management system 700 includes a host system 702 connected over a network 704 to a remote system 706. A power manager 708, e.g., like outlet strips 100 and 200 of FIGS. 1, 2A, and 2B, is used to monitor and control the operating power supplied to a plurality of computer-based appliances 714 associated with a network interface controller (NIC) 716.

Such computer-based appliances 714 are subject to software freezing or crashing, and as such can become unresponsive and effectively dead. It is also some mission-critical assignment that suffers during such down time. It is therefore the role and purpose of the network remote power management system 700 to monitor the power and environmental operating conditions in which the computer-based appliance 714 operates, and to afford management personnel the ability to turn the computer-based appliance 714 on and off from the host system 702. Such power cycling allows a power-on rebooting of software in the computer-based appliance 714 to be forced without actually having to visit the site. The operating conditions and environment are preferably reported to the host 702 on request and when alarms occur.

The power manager 708 further includes a network interface controller (NIC) 718, and this may be connected to a security device 720. If the network 704 is the Internet, or otherwise insecure, it is important to provide protection of a protocol stack 722 from accidental and/or malicious attacks that could disrupt the operation or control of the computer-based appliance 714. At a minimum, the security device 720 can be a user password mechanism. Better than that, it could include a discrete network firewall and data encryption.

The protocol stack 722 interfaces to a remote power manager 724, and it converts software commands communicated in the form of TCP/IP datapackets 726 into signals the remote power manager can use. For example, messages can be sent from the host 702 that will cause the remote power manager 724 to operate the relay-switch 712. In reverse, voltage, current, and temperature readings collected by the sensor 710 are collected by the remote power manager 724 and encoded by the protocol stack 722 into appropriate datapackets 726. Locally, a keyboard 728 can be used to select a variety of readouts on a display 730, and also to control the relay-switch 712.

The display 730 and keyboard 728 can be connected as a terminal through a serial connection to the power manager 724. Such serial connection can have a set of intervening modems that allow the terminal to be remotely located. The display 730 and keyboard 728 can also be virtual, in the sense that they are both emulated by a Telnet connection over the network 704.

The host 702 typically comprises a network interface controller (NIC) 732 connected to a computer platform and its operating system 734. Such operating system can include Microsoft WINDOWS-NT, or any other similar commercial product. Such preferably supports or includes a Telnet application 736, a network browser 738, and/or an SNMP application 740 with an appropriate MIB 742. A terminal emulation program or user terminal 744 is provided so a user can manage the system 700 from a single console.

If the computer-based appliance 714 is a conventional piece of network equipment, e.g., as supplied by Cisco Systems (San Jose, Calif.), there will usually be a great deal of pre-existing SNMP management software already installed, e.g., in host 702 and especially in the form of SNMP 740. In such case it is usually preferable to communicate with the protocol stack 722 using SNMP protocols and procedures. Alternatively, the Telnet application 736 can be used to control the remote site 706.

An ordinary browser application 738 can be implemented with MSN Explorer, Microsoft Internet Explorer, or Netscape NAVIGATOR or COMMUNICATOR. The protocol stack 722 preferably includes the ability to send hypertext transfer protocol (HTTP) messages to the host 702 in datapackets 726. In essence, the protocol stack 722 would include an embedded website that exists at the IP-address of the remote site 706. An exemplary embodiment of a similar technology is represented by the MASTERSWITCH-PLUS marketed by American Power Conversion (West Kingston, R.I.).

Many commercial network devices provide a contact or logic-level input port that can be usurped for the "tickle" signal. Cisco Systems routers, for example, provide an input that can be supported in software to issue the necessary message and identifier to the system administrator. A device interrupt has been described here because it demands immediate system attention, but a polled input port could also be used.

Network information is generally exchanged with protocol data unit (PDU) messages, which are objects that contain variables and have both titles and values. SNMP uses five types of PDU's to monitor a network. Two deal with reading terminal data, two deal with setting terminal data, and one, the trap, is used for monitoring network events such as terminal start-ups or shut-downs. When a user wants to see if a terminal is attached to the network, for example, SNMP is used to send out a read PDU to that terminal. If the terminal is attached, a user receives back a PDU with a value "yes, the terminal is attached". If the terminal was shut off, a user would receive a packet informing them of the shutdown with a trap PDU.

In alternative embodiments of the present invention, may be advantageous to include the power manager and intelligent power module functions internally as intrinsic components of an uninterruptable power supply (UPS). In applications where it is too late to incorporate such functionally, external plug-in assemblies are preferred such that off-the-shelf UPS systems can be used.

Once a user has installed and configured the power manager 708, a serial communications connection is established. For example, with a terminal or terminal emulation program. Commercial embodiments of the present invention that have been constructed use a variety of communications access methods.

For modem access, the communication software is launched that supports ANSI or VT100 terminal emulation to dial the phone number of the external modem attached to the power manager. When the modems connect, a user should see a "CONNECT" message. A user then presses the enter key to send a carriage return.

For direct RS-232C access, a user preferably starts any serial communication software that supports ANSI or VT100 terminal emulation. The program configures a serial port to one of the supported data rates (38400, 79200, 9600, 4800, 7400, 7200, and 300 BPS), along with no parity, eight data bits, and one stop bit, and must assert its Device Ready signal (DTR or DSR). A user then presses the enter key to send a carriage return.

For Ethernet network connections, the user typically connects to a power manager 708 through a modem or console serial port, a TELNET program, or TCP/IP interface. The power manager 708 preferably automatically detects the data rate of the carriage return and sends a username login prompt back to a user, starting a session. After the carriage return, a user will receive a banner that consists of the word "power manager" followed by the current power manager version string and a blank line and then a "Username:" prompt.

A user logged in with an administrative username can control power and make configuration changes. A user logged in with a general username can control power on/off cycling. Users logged in administrative usernames can control power to all intelligent power modules, a user logged in with a general username may be restricted to controlling power to a specific intelligent power module or set of intelligent power modules, as configured by the administrator.

A parent case, U.S. patent application Ser. No. 09/732,557, filed 72/08/2000, titled NETWORK-CONNECTED POWER MANAGER FOR REBOOTING REMOTE COMPUTER-BASED APPLIANCES, includes many details on the connection and command structure used for configuration management of power manager embodiments of the present invention. Such patent application is incorporated herein by reference and the reader will find many useful implementation details there. Such then need not be repeated here.

Referring again to FIG. 7, a user at the user terminal 744 is able to send a command to the power manager 724 to have the power manager configuration file uploaded. The power manager 724 concentrates the configuration data it is currently operating with into a file. The user at user terminal 744 is also able to send a command to the power manager 724 to have it accept a power manager configuration file download. The download file then follows. Once downloaded, the power manager 724 begins operating with that configuration if there were no transfer or format errors detected. These commands to upload and download configuration files are preferably implemented as an extension to an already existing repertoire of commands, and behind some preexisting password protection mechanism. HyperTerminal, and other terminal emulation programs allow users to send and receive files.

In a minimal implementation, the power manager configuration files are not directly editable because they are in a concentrated format. It would, however be possible to implement specialized disassemblers, editors, and assemblers to manipulate these files off-line.

Figure 8:
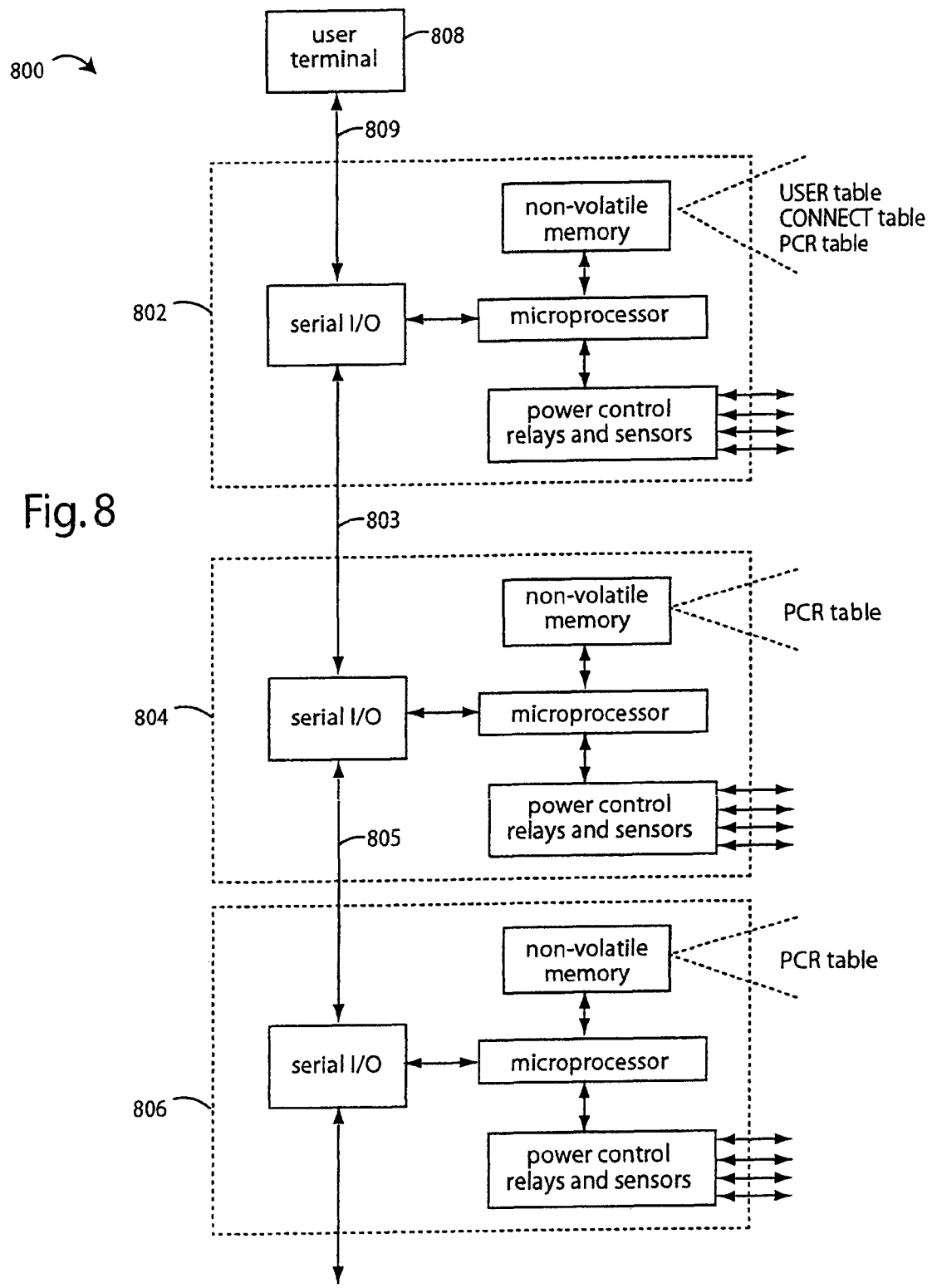
FIG. 8 is a functional block diagram of an expandable power management system embodiment of the present invention.

FIG. 8 is a diagram of an expandable power management system 800 that could be implemented in the style of the outlet strip 100 (FIG. 1). In one commercial embodiment of the present invention, a first power controller board 802 is daisy-chain connected through a serial cable 803 to a second power controller board 804. In turn, the second power controller board 804 is connected through a serial cable 805 to a third power controller board 806. All three power controller boards can communicate with a user terminal 808 connected by a cable 809, but such communication must pass through the top power controller board 802 first.

Alternatively, the user terminal could be replaced by an IP-address interface that provided a web presence and interactive webpages. If then connected to the Internet, ordinary browsers could be used to upload and download user configurations.

Each power controller board is preferably identical in its hardware and software construction, and yet the one placed at the top of the serial daisy-chain is able to detect that situation and take on a unique role as gateway. Each power controller board is similar to power controller 208 (FIG. 2). Each power controller board communicates with the others to coordinate actions. Each power controller board independently stores user configuration data for each of its power control ports. A typical implementation had four relay-operated power control ports. Part of the user configuration can include a user-assigned name for each control port.

A resynchronization program is executed in each microprocessor of each power controller board 802, 804, and 806, that detects where in the order of the daisy-chain that the particular power controller board is located. The appropriate main program control loop is selected from a collection of firmware programs that are copied to every power controller board. In such way, power controller boards may be freely added, replaced, or removed, and the resulting group will resynchronize itself with whatever is present.

The top power controller board 802 uniquely handles interactive user log-in, user-name tables, its private port names, and transfer acknowledgements from the other power controller boards. All the other power controller boards concern themselves only with their private resources, e.g., port names.

During a user configuration file upload, power controller board 802 begins a complete message for all the power controller boards in the string with the user-table. Such is followed by the first outlets configuration block from power controller board 802, and the other outlet configuration blocks from power controller boards 804 and 806. The power controller board 802 tells each when to chime in. Each block carries a checksum so transmission errors could be detected. Each block begins with a header that identifies the source or destination, then the data, then the checksum.

During a user configuration file download, power controller board 802 receives a command from a user that says a configuration file is next. The user-name table and the serial-name table is received by power controller board 802 along with its private outlets configuration block and checksum. The next section is steered to power controller board 804 and it receives its outlets configuration block and checksum. If good, an acknowledgement is sent to the top power controller board 802. The power controller boards further down the string do the same until the whole download has been received. If all power controller boards returned an acknowledgement, the power controller board 802 acknowledges the whole download. Operation then commences with the configuration. Otherwise a fault is generated and the old configuration is retained.

In general, embodiments of the present invention provide power-on sequencing of its complement of power-outlet sockets so that power loading is brought on gradually and not all at once. For example, power comes up on the power outlet sockets 2-4 seconds apart. An exaggerated power-up in-rush could otherwise trip alarms and circuit breakers. Embodiments display or otherwise report the total current being delivered to all, loads, and some embodiments monitor individual power outlet sockets. Further embodiments of the present invention provide individual remote power control of independent power outlet sockets, e.g., for network operations center reboot of a crashed network server in the field.

The power-on sequencing of the power-outlet sockets preferably allows users to design the embodiments to be loaded at 80% of full capacity, versus 60% of full capacity for prior art units with no sequencing. In some situations, the number of power drops required in a Data Center can thus be reduced with substantial savings in monthly costs.

FIG. 9 represents a power distribution unit (PDU) embodiment of the present invention, and is referred to herein by the general reference numeral 900. The PDU 900 allows a personality module 902 to be installed for various kinds of control input/output communication. For an Ethernet interface, a NetSilicon type NET+50 system-on-a-chip is preferred, otherwise a Philips Semiconductor type P89C644 microcontroller could be used in personality module 902.

The PDU 900 further comprises an I2C peripheral board 904, and a set of four IPM's 906, 908, 910, and 912. Such provide sixteen power outlets altogether. A power supply 914 provides +5-volt logic operating power, and a microcontroller with a serial connection to an inter-IC control (I2C) bus 917. Such I2C-bus 917 preferably conforms to industry standards published by Philips Semiconductor (The Netherlands). See, www.semiconductor.philips.com. Philips Semiconductor type microcontrollers are preferably used throughout PDU 900 because I2C-bus interfaces are included.

A SENTRY-slave personality module 916 could be substituted for personality module 902 and typically includes a Server Technology, Inc. (Reno, Nev.) SENTRY-type interface and functionality through a standard RJ12 jack. See, e.g., website at www.servertech.com. A slave personality module 918 could be substituted for personality module 902 and provides a daisy-chain I2C interface and functionality through a standard RJ12 jack. A terminal-server personality module 920 could be substituted for personality module 902 and provides a display terminal interface, e.g., via I2C through a standard RJ12 jack, or RS-232 serial on a DIN connector. A network personality module 922 preferably provides a hypertext transfer protocol (http) browser interface, e.g., via 100Base-T network interface and a CAT-5 connector. The on-board microcontroller provides all these basic personalities through changes in its programming, e.g., stored in EEPROM or Flash memory devices. All of PDU 900 is preferably fully integrated, e.g., within power distribution outlet strip 100, in FIG. 1.

FIG. 10 illustrates an intelligent power module (IPT-IPM) 1000 and represents one way to implement IPT-IPM's 120-123 of FIG. 1; IPT-IPM's 220-223 of FIGS. 2A and 2B; IPT-IPM 300 of FIG. 3; IPT-IPM 400 of FIG. 4; power controller boards 802, 804, and 806 of FIG. 8; and, 4-port IPM's 906, 908, 910, and 912 of FIG. 9. The IPT-IPM 1000 comprises an I2C microcontroller 1002 connected to communicate on a daisy-chain I2C serial bus with in and out connectors 1004 and 1006. An AC-Line input 1008, e.g., from IPT-PS 118 in FIG. 1, is independently switched under microcontroller command to AC-Line output-1 1010, AC-Line output-2 1011, AC-Line output-3 1012, and AC-Line output-4 1013. A set of four relays (K1-K4) 1014-1017 provide normally open (NO) contacts 1018-1021. DC-power to operate the relays is respectively provided by relay power supplies 1022-1025. Optical-isolators 1026-1029 allow logic level outputs from the microcontroller 1002 to operate the relays in response to I2C commands received from the I2C-bus.

Similarly, optical-isolators 1030-1033 allow the presence of AC-Line voltages at AC-Line output-1 1010, AC-Line output-2 1011, AC-Line output-3 1012, and AC-Line output-4 1013, to be sensed by logic level digital inputs to microcontroller 1002. These are read as status and encoded onto the I2C-bus in response to read commands. A local user is also provided with a LED indication 1034-1037 of the AC-Line outputs. A set of load sensors 1038-1041 sense any current flowing through the primaries of respective isolation transformers 1042-1045. A logic level LS1-LS4 is respectively provided to microcontroller 1002 to indicate if current is flowing to the load.

In general, remote power management embodiments of the present invention are configurable and scaleable. Such provides for maximum fabricator flexibility in quickly configuring modular components to meet specific customer requests without overly burdening the manufacturing process. The following list of various customer requirements can all be met with minimal hardware, and no software changes: Vertical or Horizontal enclosure mounting; Variable controllable outlet configurations (4, 8, 12, 16 outlets/enclosure); Variable number of power input feed configurations to support redundant power to critical network equipment (up to 4 input feeds); Option of displaying one or more input load currents on a dual 7-segment LED display(s); Ability to reorient the enclosure without having to invert the 7-segment LED display(s); Measuring per outlet load current for individual appliance load reporting; and a Variety of user interfaces that can be substituted at final product configuration time.

A modular component concept allows for communications and automated detection of any included modular components over a common communications channel. So a multi-drop, addressable, and extensible bus architecture is used. The Inter-IC (I2C) bus developed by Philips semiconductor is preferred. Each modular component contains a microprocessor capable of interpreting and responding to commands over I2C-bus. An application layer enhancement on top of the standard I2C-protocol allows for data integrity checking. A checksum is appended to all commands and responses. Such checksum is validated before commands are acted upon, and data responses are acknowledged. Each module on the I2C power control bus has either a hard-coded or configurable address to enable multiple components to communicate over the same two wires that comprise the bus. Configuration jumpers on the power supply module are used to select operational items, e.g., #Power input feeds, #four port Intelligent Power Modules (IPM) attached to each input feed, Input feed overload current threshold, and Display inversion.

The main components used in most instances are the power supply board (IPT-PS) that supplies DC voltage on the interconnection bus, and monitors and reports input feed load and enclosure configuration information; the intelligent power module IPM (IPT-IPM) which controls the source of power to each outlet based on I2C commands from the master controller personality module (PM), and that reports whether the outlet is in the requested state and the outlet load current back to the master controller; the display board (IPT-I2C) used to display load current as supplied by the master controller and to monitor user-requested resets, and that can communicate with sensors attached to its Dallas Semiconductor-type "1-wire" bus to the master controller; and, the personality modules that act as an I2C-bus master, e.g., IPT-Serial PM, IPT-Slave PM, and IPT-Network PM.

Such personality module can initialize, issue commands to, and receive responses from the various components on the bus. It also is responsible for executing user power control and configuration requests, by issuing commands on the bus to the various modules that perform these functions. These personality modules support several user interfaces and can be swapped to provide this functionality. The IPT-Serial PM is used for serial only communications. The IPT-Slave PM is used to connect to an earlier model controllers, and allows for a variety of user interfaces, e.g., Telnet, Http, SNMP, serial, modem. The IPT-Network PM has much of the same functionality as a previous model controller, but has all that functionality contained on the personality module itself and requires no external enclosure.

By combining and configuring these components, a variety of power control products can be constructed in many different enclosure forms, each with a variety of power input feed and outlet arrangements.

Lower-cost power control products can be linked to a more expensive master controller using an IPT-Network PM to configure a large-scale power control network that needs only a single IP-address and user interface. Such would require a high level, high bandwidth, multi-drop communications protocol such as industry-standard Controller Area Network (CAN). The CAN bus supports 1-Mbit/sec data transfers over a distance of 40 meters. This would enable serial sessions from a user to serial ports on the device being controlled to be virtualized and thus avoid needing costly analog switching circuitry and control logic.

Although the present invention has been described in terms of the present embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An electrical power distribution system of a type being connectable to provide power to one or more electrical loads in an electrical equipment rack, the power distribution system comprising:

a power distribution unit enclosure comprising an integral housing mountable in an electrical equipment rack;

a power input penetrating the power distribution unit enclosure;

a plurality of power outputs disposed in the power distribution unit enclosure, wherein each of the plurality of power outputs is connectable to a corresponding one of the one or more electrical loads;

a power distribution unit bus portion having data communications capability within the power distribution unit enclosure;

an intelligent power system within the power distribution unit enclosure, and in communication with at least one of the plurality of power outputs and connectable to a communications network external to the power distribution unit enclosure, the intelligent power system comprising (i) a first controller system being in power controlling communication with at least a first power output of the plurality of power outputs and (ii) a second controller system in communication with the first controller system through the power distribution unit bus portion and being in power controlling communication with at least a second power output of the plurality of power outputs;

a remote power manager application connectable to be in communication with the intelligent power system through the power distribution unit bus portion, wherein the power manager application is in power-on sequencing communication with the intelligent power system;

wherein a communications protocol of the communications network is different than a communications protocol of the power distribution unit communications bus portion; and wherein the intelligent power system communicates with the power manager application through the external network using a first communications protocol and communicates with the first and second controller systems through the power distribution unit bus portion using a second communications protocol.

2. The electrical power distribution system of claim 1 wherein the power manager application and intelligent power system support Internet Protocol communications through the communications network.

3. The electrical power distribution system of claim 2, wherein the power distribution unit enclosure has a vertical form factor.

4. The electrical power distribution system of claim 3, wherein the intelligent power system is in communication with each among the plurality of power outputs.

5. The electrical power distribution system of claim 1, wherein the power distribution unit enclosure has a vertical form factor.

6. The electrical power distribution system of claim 5, wherein the intelligent power system is in communication with each among the plurality of power outlets.

7. The electrical power distribution system of claim 1, wherein the intelligent power system is in communication with each among the plurality of power outputs.

8. The electrical power distribution system of claim 1, wherein the first controller system and second controller system are in controlling communication with one or more relays that each supply operating power to an associated power output.

* * * * *